(12) United States Patent
Tamura

(10) Patent No.: US 8,098,301 B2
(45) Date of Patent: Jan. 17, 2012

(54) ZOOM LENS AND IMAGE PICKUP APPARATUS

(75) Inventor: Masaki Tamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 104 days.

(21) Appl. No.: 12/662,416

(22) Filed: Apr. 16, 2010

(65) Prior Publication Data

US 2010/0315545 A1 Dec. 16, 2010

(30) Foreign Application Priority Data

Jun. 10, 2009 (JP) ................................. 2009-139419

(51) Int. Cl.
*H04N 5/262* (2006.01)

(52) U.S. Cl. ..................... 348/240.3; 348/335; 348/340; 348/345

(58) Field of Classification Search ............... 348/240.3, 348/208.4, 208.11, 335, 340, 345, 348; 359/554; 396/111, 114

See application file for complete search history.

(56) References Cited

U.S. PATENT DOCUMENTS

| 6,081,390 A * | 6/2000 | Konno ........................ 359/689 |
| 2002/0126383 A1* | 9/2002 | Hayakawa .................... 359/557 |
| 2004/0012704 A1* | 1/2004 | Hagimori et al. ............. 348/335 |
| 2004/0080632 A1* | 4/2004 | Iwasawa et al. ........... 348/240.3 |

FOREIGN PATENT DOCUMENTS

| JP | 2004-354869 A | 12/2004 |
| JP | 2008-033208 | 2/2008 |

* cited by examiner

*Primary Examiner* — Yogesh Aggarwal
(74) *Attorney, Agent, or Firm* — Rader, Fishman & Grauer PLLC

(57) ABSTRACT

Provided is a zoom lens including a first lens group, a second lens group having a negative refractive power, a third lens group having a positive refractive power, and a fourth lens group having a positive refractive power, wherein conditional expressions $f12/fw>2.0$, $f2/fw<-2.0$, $-2.0 \leq f12/f2 \leq -0.5$, and $vd21-vd22>20$ are satisfied, where $f12$ is a focal length of a single lens having a positive refractive power in the first lens group, $f2$ is a focal length of the second lens group, $fw$ is a focal length of the total lens system at a wide angle end, $vd21$ is an Abbe number of the lens having a negative refractive power in the second lens group for the d-line, and $vd22$ is an Abbe number of the lens having a positive refractive power in the second lens group for the d-line.

9 Claims, 17 Drawing Sheets

ZOOM LENS AND IMAGE PICKUP APPARATUS

BACKGROUND OF THE INVENTION

1. Field of the Invention

The present invention relates to a zoom lens and an image pickup apparatus. In particular, the present invention relates to a zoom lens having a zoom ratio of about three and that is suitable for a camera-equipped mobile phone and a digital still camera including a solid-state image pickup device, and to an image pickup apparatus including the zoom lens.

2. Description of the Related Art

Image pickup apparatuses, such as camera-equipped mobile phones or digital still cameras, using a solid-state image pickup device such as a charge coupled device (CCD) or a complementary metal-oxide semiconductor (CMOS) device, have become widespread. Reduction in the size and thickness of such an image pickup apparatus has been desired, and there has been an increasing demand for reduction in the length and depth of an image pickup lens included in the image pickup apparatus.

In recent years, compact image pickup apparatuses such as camera-equipped mobile phones have been reduced in size and the number of pixels of image pickup devices included in the compact image pickup apparatuses have increased. Accordingly, high performance lenses compatible with high-pixel-count solid-state image pickup devices have been desired for use in the compact image pickup apparatuses.

In such a situation, there has been an increasing demand for compact image pickup apparatuses such as camera-equipped mobile phones equipped an optical zoom lens. Moreover, it has been desired to obtain high performance at a low production cost.

In order to reduce the size and thickness thereof and obtain a high-performance, some zoom lenses include a lens group having a prism for bending a light path so as to reduce the size and thickness of the zoom lens along the optical axis of an incident light beam (see, for example, Japanese Unexamined Patent Application Publication No. 2004-354869 and No. 2008-33208).

SUMMARY OF THE INVENTION

A zoom lens described in Japanese Unexamined Patent Application Publication No. 2004-354869 includes, in sequence from the object side to the image side, a first lens group having a positive refractive power, a second lens group having a negative refractive power, a third lens group having a positive refractive power, a fourth lens group having a positive refractive power, and a fifth lens group having a negative refractive power.

In the zoom lens described in Japanese Unexamined Patent Application Publication No. 2004-354869, a prism for bending a light path is disposed in the first lens group so as to reduce the thickness of the zoom lens, and high optical performance is obtained over the entire zooming range from the wide angle end to the telephoto end.

However, the total optical length of this type of zoom lens is still long, and the reduction in size is still insufficient for use in a compact image pickup apparatus such as a camera-equipped mobile phone. Moreover, the production cost is high, because a large number of lenses are used and the lenses are made of a glass material.

A zoom lens described in Japanese Unexamined Patent Application Publication No. 2008-33208 includes, in sequence from the object side to the image side, a first lens group having a weak refractive power, a second lens group having a negative refractive power, a third lens group having a positive refractive power, and a fourth lens group having a positive refractive power.

Also in the zoom lens described in Japanese Unexamined Patent Application Publication No. 2008-33208, a prism for bending a light path is disposed in the first lens group so as to reduce the thickness of the zoom lens. Moreover, a plurality of lenses used in the zoom lens are made of a resin material so as to reduce the production cost and to reduce the total optical length.

However, because the second lens group of this zoom lens is constituted by one lens having a negative refractive power, chromatic aberration, in particular, transverse chromatic aberration at the wide angle end and longitudinal chromatic aberration at the telephoto end are not sufficiently corrected. As a result, the performance of the zoom lens is insufficient to be used with a recent solid-state image pickup device having a high pixel count.

To address the above-identified problem, it is desirable to provide a zoom lens and an image pickup apparatus having a simple structure and high optical performance compatible with an image pickup device having a high pixel count, having a stable performance that is not seriously affected when the ambient temperature changes, and having reduced production cost and reduced size and thickness.

According to an embodiment of the present invention, there is provided a zoom lens including a first lens group, a second lens group having a negative refractive power, a third lens group having a positive refractive power, and a fourth lens group having a positive refractive power, wherein zooming and correction of an imaging position during zooming are performed by moving at least one of the second lens group and the third lens group, wherein the first lens group includes, in sequence from the object side to the image side, a single lens having a negative refractive power, a prism for bending a light path, and a single lens having a positive refractive power and made of a resin material, wherein the second lens group includes, in sequence from the object side to the image side, one lens having a negative refractive power and made of a resin material and one lens having a positive refractive power and made of a resin material, and wherein the following conditional expressions $$f12/fw > 2.0, \quad (1)$$

$$f2/fw < -2.0, \quad (2)$$

$$-2.0 \leq f12/f2 \leq 0.5, \text{ and} \quad (3)$$

$$vd21 - vd22 > 20 \quad (4)$$

are satisfied, where f12 is a focal length of the single lens having a positive refractive power included in the first lens group, f2 is a focal length of the second lens group, fw is a focal length of the total lens system at a wide angle end, vd21 is an Abbe number of the lens having a negative refractive power included in the second lens group for the d-line, and vd22 is an Abbe number of the lens having a positive refractive power included in the second lens group for the d-line.

Thus, with the zoom lens, the production cost is reduced by using the lenses made of a resin material, and deterioration of the optical performance due to variation in the ambient temperature is suppressed.

It is preferable that, in the zoom lens, the third lens group include at least one lens having a positive refractive power and at least one lens having a negative refractive power, the at least one lens having a positive refractive power be disposed nearest to an object in the third lens group, the at least one lens having a negative refractive power be disposed nearest to an image in the third lens group, and the following conditional expression $$0.9 < \beta 3W \cdot \beta 3T < 1.1 \tag{5}$$

be satisfied, where β3W is a lateral magnification of the third lens group at the wide angle end with respect to an object at infinity, and β3T is a lateral magnification of the third lens group at the telephoto end with respect to an object at infinity.

When the zoom lens has the structure described above and satisfies the conditional expression (5), the position of the principal point of the third lens group becomes close to the second lens group and the magnification of the third lens group is limited.

It is preferable that the zoom lens satisfy the following conditional expression $$1.7 < f22/fw < 3.1, \tag{6}$$

where f22 is a focal length of the lens having a positive refractive power included in the second lens group.

When the zoom lens satisfies the conditional expression (6), the refractive power of the lens having a positive refractive power included in the second lens group and made of a resin material is limited and the refractive power of the lenses included in the second lens group increases, whereby correction of transverse chromatic aberration, in particular, correction of coma and field curvature is appropriately performed.

It is preferable that, in the zoom lens, the lens having a negative refractive power included in the second lens group and the lens having a positive refractive power included in the second lens group be cemented to each other.

When the lens having a negative refractive power included in the second lens group and the lens having a positive refractive power included in the second lens group are cemented to each other, the sensitivity in a deflected state is reduced.

According to an embodiment of the present invention, there is provided an image pickup apparatus including a zoom lens and an image pickup device that converts an optical image formed by the zoom lens to an electrical signal, wherein the zoom lens includes, in sequence from the object side to the image side, a first lens group, a second lens group having a negative refractive power, a third lens group having a positive refractive power, and a fourth lens group having a positive refractive power, wherein zooming and correction of an imaging position during zooming are performed by moving at least one of the second lens group and the third lens group, wherein the first lens group includes, in sequence from the object side to the image side, a single lens having a negative refractive power, a prism for bending a light path, and a single lens having a positive refractive power and made of a resin material, wherein the second lens group includes, in sequence from the object side to the image side, one lens having a negative refractive power and made of a resin material and one lens having a positive refractive power and made of a resin material, and wherein the following conditional expressions $$f12/fw > 2.0, \tag{1}$$

$$f2/fw < -2.0, \tag{2}$$

$$-2.0 \leq f12/f2 \leq -0.5, \text{ and} \tag{3}$$

$$vd21 - vd22 > 20 \tag{4}$$

are satisfied, where f12 is a focal length of the single lens having a positive refractive power included in the first lens group, f2 is a focal length of the second lens group, fw is a focal length of the total lens system at a wide angle end, vd21 is an Abbe number of the lens having a negative refractive power included in the second lens group for the d-line, and vd22 is an Abbe number of the lens having a positive refractive power included in the second lens group for the d-line.

Thus, with the image pickup apparatus, the production cost is reduced by using the lenses made of a resin material, and deterioration of the optical performance due to variation in the ambient temperature is suppressed.

A zoom lens according to an embodiment of the present invention includes a first lens group, a second lens group having a negative refractive power, a third lens group having a positive refractive power, and a fourth lens group having a positive refractive power, wherein zooming and correction of an imaging position during zooming are performed by moving at least one of the second lens group and the third lens group, wherein the first lens group includes, in sequence from the object side to the image side, a single lens having a negative refractive power, a prism for bending a light path, and a single lens having a positive refractive power and made of a resin material, wherein the second lens group includes, in sequence from the object side to the image side, one lens having a negative refractive power and made of a resin material and one lens having a positive refractive power and made of a resin material, and wherein the following conditional expressions $$f12/fw > 2.0, \tag{1}$$

$$f2/fw < -2.0, \tag{2}$$

$$-2.0 \leq f12/f2 \leq -0.5, \text{ and} \tag{3}$$

$$vd21 vd22 > 20 \tag{4}$$

are satisfied, where f12 is a focal length of the single lens having a positive refractive power included in the first lens group, f2 is a focal length of the second lens group, fw is a focal length of the total lens system at a wide angle end, vd21 is an Abbe number of the lens having a negative refractive power included in the second lens group for the d-line, and vd22 is an Abbe number of the lens having a positive refractive power included in the second lens group for the d-line.

Thus, with a simple structure, the zoom lens has high optical performance compatible with a large-pixel-count image pickup device, and the production cost, the size, and the thickness of the zoom lens can be reduced.

In a zoom lens according to an embodiment of the present invention, the third lens group includes at least one lens having a positive refractive power and at least one lens having a negative refractive power, the at least one lens having a positive refractive power is disposed nearest to an object in the third lens group, the at least one lens having a negative refractive power is disposed nearest to an image in the third lens group, and the following conditional expression $$0.9 < \beta 3W \cdot \beta 3T < 1.1 \tag{5}$$

is satisfied, where β3W is a lateral magnification of the third lens group at the wide angle end with respect to an object at infinity, and β3T is a lateral magnification of the third lens group at the telephoto end with respect to an object at infinity.

Thus, a short and compact zoom lens can be provided.

A zoom lens according to an embodiment of the present invention satisfies the following conditional expression $$1.7 < f22/fw < 3.1, \tag{6}$$

where f22 is a focal length of the lens having a positive refractive power included in the second lens group.

Thus, high optical performance can be secured and the size of the zoom lens can be reduced.

In a zoom lens according to an embodiment of the present invention, the lens having a negative refractive power included in the second lens group and the lens having a positive refractive power included in the second lens group are cemented to each other. Thus, the sensitivity in a deflected state can be reduced, and the mass productivity can be increased.

An image pickup apparatus according to an embodiment of the present invention includes a zoom lens, and an image pickup device that converts an optical image formed by the zoom lens to an electrical signal, wherein the zoom lens includes, in sequence from the object side to the image side, a first lens group, a second lens group having a negative refractive power, a third lens group having a positive refractive power, and a fourth lens group having a positive refractive power, wherein zooming and correction of an imaging position during zooming are performed by moving at least one of the second lens group and the third lens group, wherein the first lens group includes, in sequence from the object side to the image side, a single lens having a negative refractive power, a prism for bending a light path, and a single lens having a positive refractive power and made of a resin material, wherein the second lens group includes, in sequence from the object side to the image side, one lens having a negative refractive power and made of a resin material and one lens having a positive refractive power and made of a resin material, and wherein the following conditional expressions $$f12/fw > 2.0, \quad (1)$$

$$f2/fw < -2.0, \quad (2)$$

$$-2.0 \leq f12/f2 \leq -0.5, \text{ and} \quad (3)$$

$$vd21 - vd22 > 20 \quad (4)$$

are satisfied, where f12 is a focal length of the single lens having a positive refractive power included in the first lens group, f2 is a focal length of the second lens group, fw is a focal length of the total lens system at a wide angle end, vd21 is an Abbe number of the lens having a negative refractive power included in the second lens group for the d-line, and vd22 is an Abbe number of the lens having a positive refractive power included in the second lens group for the d-line.

Thus, with a simple structure, the image pickup apparatus has high optical performance compatible with a large-pixel-number image pickup device, and the size and the thickness of the image pickup apparatus can be reduced while suppressing increase in production cost.

DESCRIPTION OF THE PREFERRED EMBODIMENTS

Figure 1:
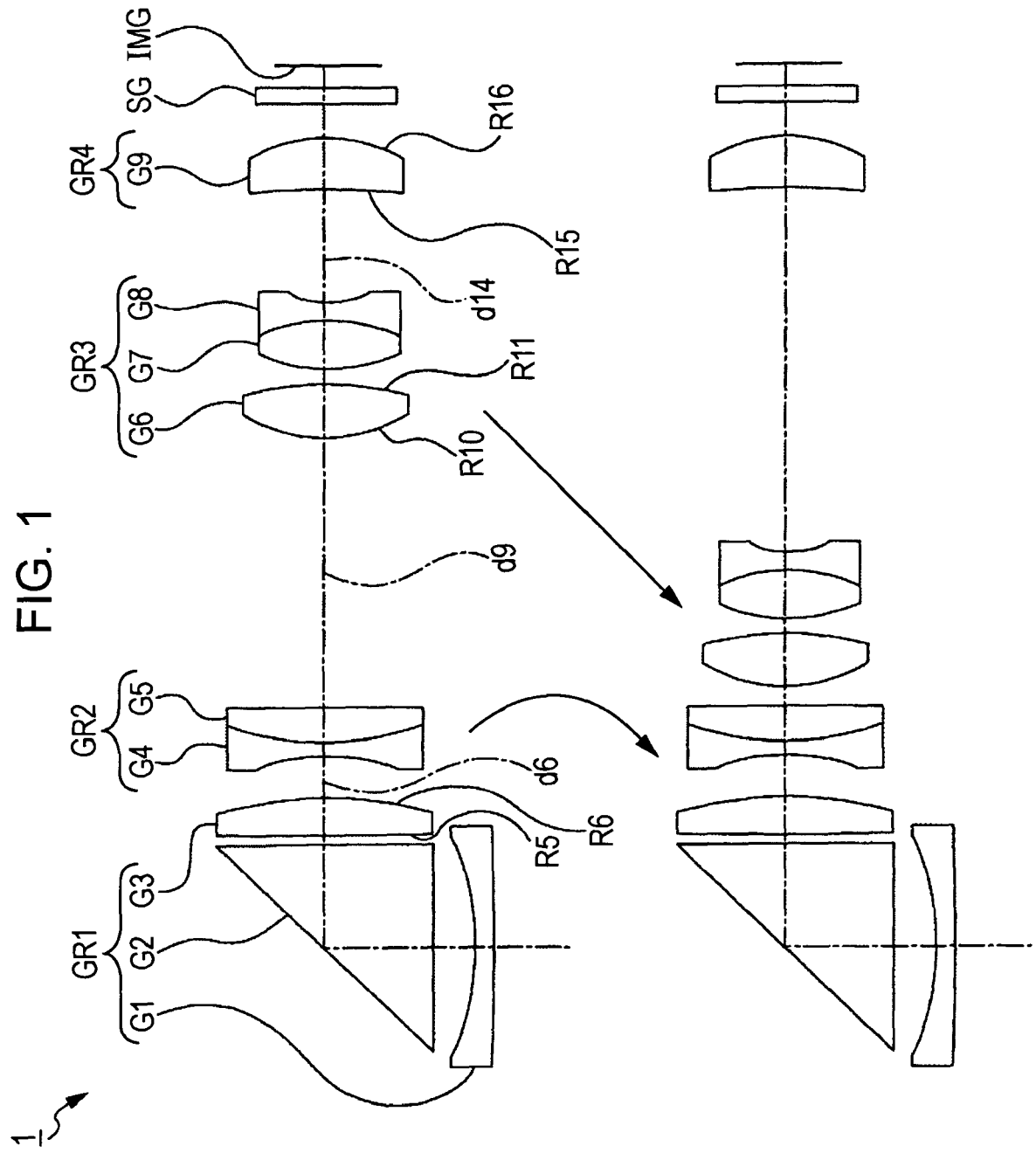
FIG. 1 illustrates the lens structure of a zoom lens according to a first embodiment of the present invention.

Hereinafter, a zoom lens and an image pickup apparatus according to embodiments of the present invention will be described.

Structure of Zoom Lens

A zoom lens according to an embodiment of the present invention includes, in sequence from the object side to the image side, a first lens group, a second lens group having a negative refractive power, a third lens group having a positive refractive power, and a fourth lens group having a positive refractive power. Zooming and correction of the imaging position during zooming are performed by moving at least one of the second lens group and the third lens group.

Because the zoom lens has such refractive power arrangement, the total optical length and the size of the zoom lens are reduced.

The first lens group is fixed during zooming. A seal glass for protecting an image pickup device is disposed between the fourth lens group and the image surface.

With the zoom lens according to the embodiment of the present invention, zooming and correction of the imaging position during zooming can be performed by moving the second and third lens groups, or by moving the second, third, and fourth lens groups.

The first lens group of the zoom lens according to the embodiment of the present invention includes, in sequence from the object side to the image side, a single lens having a negative refractive power, a prism for bending a light path, and a single lens having a positive refractive, power and made of a resin material.

Because the first lens group has this structure, movable lens groups are moved during zooming along the optical axis of the single lens having a positive refractive power included in the first lens group, whereby the thickness of the zoom lens along the optical axis of an incident light beam can be reduced.

The second lens group of the zoom lens according to the embodiment of the present invention includes, in sequence from the object side to the image side, one lens having a negative refractive power and made of a resin material and one lens having a positive refractive power and made of a resin material.

Because the second lens group has this structure and the zoom lens satisfies the conditional expressions (1) to (4) described below, high optical performance is secured, an increase in production cost is suppressed, and degradation of optical property due to variation in the ambient temperature can be suppressed.

Because the second lens group includes one lens having a negative refractive power and one lens having a positive refractive power as described above, chromatic aberration, in particular, transverse chromatic aberration at the wide angle end and longitudinal chromatic aberration at the telephoto end are appropriately corrected.

The zoom lens according to the embodiment of the present invention satisfies the following conditional expressions $$f12/fw > 2.0, \quad (1)$$

$$f2/fw < -2.0, \quad (2)$$

$$-2.0 \leq f12/f2 \leq -0.5, \text{ and} \quad (3)$$

$$vd21 - vd22 > 20, \quad (4)$$

where f12 is the focal length of the single lens having a positive refractive power included in the first lens group, f2 is the focal length of the second lens group, fw is the focal length of the total lens system at the wide angle end, vd21 is the Abbe number of the lens having a negative refractive power included in the second lens group for the d-line, and vd22 is the Abbe number of the lens having a positive refractive power included in the second lens group for the d-line.

The conditional expression (1) represents the ratio of the focal length of the single lens having a positive refractive power included in the first lens group to the focal length of the total lens system at the wide angle end, and limits the refractive power of the single lens having a positive refractive power included in the first lens group.

If the conditional expression (1) is not satisfied, the refractive power of the lens made of a resin material (the single lens having a positive refractive power included in the first lens group) is too high. In this case, it is difficult to secure high optical performance, because the optical property (the index of refraction and the Abbe number) of a resin material varies comparatively widely.

Therefore, because the zoom lens satisfies the conditional expression (1), high optical performance is secured even when a lens made of a resin material is used.

The conditional expression (2) represents the ratio of the focal length of the second lens group to the focal length of the total lens system at the wide angle end, and limits the refractive power of the second lens group.

If the conditional expression (2) is not satisfied, the refractive power of the lens group made of a resin material (the second lens group) is too high. In this case, it is difficult to secure high optical performance, because the optical property (the index of refraction and the Abbe number) of a resin material varies comparatively widely.

Therefore, because the zoom lens satisfies the conditional expression (2), high optical performance is secured even when a lens made of a resin material is used.

The conditional expression (3) represents the ratio of the focal length of the single lens having a positive refractive power included in the first lens group to the focal length of the second lens group, and limits the balance of refractive power.

If the conditional expression (3) is not satisfied, the balance of aberration correction is disturbed when the ambient temperature varies, so that the optical performance deteriorates and it becomes difficult to maintain high optical performance compatible with an image pickup device having a high pixel count.

Therefore, because the zoom lens satisfies the conditional expression (3), high optical performance is maintained even when the single lens having a positive refractive power included in the first lens group and the lenses included in the second lens group are made of a resin material and the ambient temperature varies.

The conditional expression (4) represents the difference between the Abbe number of the lens having a negative refractive power included in the second lens group for the d-line and the Abbe number of the lens having a positive refractive power included in the second lens group for the d-line, and specifies a condition for appropriately correcting chromatic aberration generated in the second lens group.

If the conditional expression (4) is not satisfied, it becomes difficult to correct chromatic aberration, in particular, transverse chromatic aberration at the wide angle end and longitudinal chromatic aberration at the telephoto end.

Therefore, because the zoom lens satisfies the conditional expression (4), chromatic aberration generated in the second lens group, in particular, transverse chromatic aberration at the wide angle end and longitudinal chromatic aberration at the telephoto end are appropriately corrected, so that the optical performance can be improved.

The production cost of the zoom lens according to the embodiment of the present invention can be reduced, because a lens disposed nearest to the image in the first lens group and two lenses in the second lens group are made of a resin material as described above.

Moreover, the lens disposed nearest to the image in the first lens group has a positive refractive power, and the second lens group has a negative refractive power. The ratio of the focal length of the lens disposed nearest to the image in the first lens group to the focal length of the second lens group is limited to a small value within the range of 0.5 to 2 as shown by the conditional expression (3).

Because the lens disposed nearest to the image in the first lens group has a positive refractive power and the second lens group has a negative refractive power, and the ratio between the focal lengths thereof is limited to a small value, deterioration of the performance due to variation in the ambient temperature is suppressed. That is, variation in aberration, which is generated in one of the second lens group and the lens disposed nearest to the image in the first lens group owing to variation in the ambient temperature, is prevented from being generated in the other one of the lens and the lens group, whereby high optical performance is secured.

Therefore, the production cost of the zoom lens is reduced by using the lenses made of a resin material, and deterioration of the optical performance due to variation in the ambient temperature is suppressed, so that high optical performance can be secured.

In the zoom lens according to the embodiment of the present invention, a lens disposed on the image side in the second lens group has a meniscus shape that is convex toward the object side and concave toward the image side. Therefore, distortion can be appropriately corrected.

It is preferable that, in a zoom lens according to an embodiment of the present invention, the third lens group include at least one lens having a positive refractive power and at least one lens having a negative refractive power. Moreover, it is preferable that the at least one lens having a positive refractive power be disposed nearest to the object in the third lens group, the at least one lens having a negative refractive power be disposed nearest to the image in the third lens group, and the following conditional expression $$0.9 < \beta 3W \cdot \beta 3T < 1.1 \quad (5)$$

be satisfied, where β3W is the lateral magnification of the third lens group at the wide angle end with respect to an object at infinity, and β3T is a lateral-magnification of the third lens group at the telephoto end with respect to an object at infinity.

When the third lens group has this structure and satisfies the conditional expression (5), a short and compact zoom lens can be provided.

That is, when the lens having a positive refractive power is disposed nearest to the object in the third lens group and the lens having a negative refractive power is disposed nearest to the image in the third lens group, the position of the principal point of the third lens group can be made close to the second lens group, whereby the total length of the zoom lens at the telephoto end, which determines the size of the zoom lens, can be reduced.

The conditional expression (5) represents the product of the lateral magnification of the third lens group at the wide angle end with respect to an object at infinity and the lateral magnification of the third lens group at the telephoto end with respect to an object at infinity, and limits the magnification of the third lens group.

If the conditional expression (5) is not satisfied, the total length of the optical system increases and it becomes difficult to reduce the size of the zoom lens. Therefore, for example, in the embodiment, the lateral magnification of the third lens group is set to be about −1 at an intermediate focal position between the wide angle end and the telephoto end, so that the total length of the optical system is limited and the size of the zoom lens is reduced.

It is preferable that a zoom lens according to an embodiment of the present invention satisfy the following conditional expression $$1.7 < f22/fw < 3.1, \quad (6)$$

where f22 is the focal length of the lens having a positive refractive power included in the second lens group.

In general, when the second lens group includes a lens made of a resin material having an index of refraction lower than that of glass, the refractive power of the lens having a positive refractive power included in the second lens group is to be set in an appropriate range in order to suppress optical aberration that is generated in the second lens group and reduce the size of the lens system.

When the second lens group satisfies the conditional expression (6), high optical performance can be secured and the size of the zoom lens can be reduced.

The conditional expression (6) represents the ratio of the focal length of the lens having a positive refractive power included the second lens group to the focal length of the total lens system at the wide angle end, and limits the refractive power of the lens having a positive refractive power included in the second lens group and made of a resin material.

If the lower limit of the conditional expression (6) is not satisfied, the size of the zoom lens may be reduced relatively easily. However, in this case, it is difficult to correct transverse chromatic aberration, in particular, coma and field curvature, because the refractive power of each lens included in the second lens group increases.

If the upper limit of the conditional expression (6) is not satisfied, aberration may be corrected relatively easily. However, in this case, the total length of the zoom lens is increased and reduction in size becomes difficult.

Therefore, when the zoom lens satisfies the conditional expression (6), transverse chromatic aberration can be appropriately corrected, and the total length and the size of the zoom lens can be reduced.

It is preferable that, in a zoom lens according an embodiment of the present invention, the lens having a negative refractive power included in the second lens group and the lens having a positive refractive power included in the second lens group be cemented to each other.

When the lens having a negative refractive power included in the second lens group and the lens having a positive refractive power included in the second lens group are cemented to each other, sensitivity in a deflected state can be reduced and mass productivity can be increased.

If the lens having a negative refractive power included in the second lens group and the lens having a positive refractive power included in the second lens group are not cemented to each other, the shapes of the surfaces facing each other can be flexibly designed and aberration can be appropriately corrected.

With a zoom lens according to an embodiment of the present invention, focusing on an object in a close range can be performed by moving the second lens group or the fourth lens group along the optical axis.

With a zoom lens according to an embodiment of the present invention, an image on the image surface can be moved and motion blur can be optically corrected by moving a part of or all of the lens groups in a direction that is not parallel to the optical axis.

Numerical Examples of Zoom Lens

Embodiments of zoom lenses according to the present invention and numerical examples, which are obtained by assigning specific values to the embodiments, will be described with reference to the drawings and the tables.

Meanings of symbols used in the tables and the description are as follows.

"f" denotes the focal length, "Fno" denotes the F. number, "2ω" denotes the angle of view, "Si" denotes the surface number, "Ri" denotes the radius of curvature, "di" denotes the inter-surface distance between the i-th surface and the (i+1)-th surface along the optical axis, "ni" denotes the index of refraction, and "vi" denotes the Abbe number. Regarding the radius of curvature of a surface, "ASP" represents that the surface is aspheric and "∞" represents that the surface is flat. Regarding the inter-surface distance along the optical axis, "variable" represents that the inter-surface distance is variable. "K" denotes the conic constant, and "A", "B", "C", and "D" respectively denote the 4th order, the 6th order, the 8th order, and the 10th order aspheric coefficients.

The index of refraction ni and the Abbe number vi are for the d-line (λ=587.6 nm).

Some lenses in the numerical examples have aspheric surfaces. The aspheric shape is defined by the following expression (1), where "Z" is the distance from the vertex of the lens surface along the optical axis (aspheric depth), "Y" is the height in the direction perpendicular to the optical axis (image height), "R" is the paraxial curvature at the vertex of the lens (the reciprocal of the radius of curvature), "K" is the conic constant, and "A", "B", "C", and "D" are respectively the 4th order, the 6th order, the 8th order, and the 10th order aspheric coefficients.

$$Z = \frac{Y^2/R}{1+\sqrt{1-(1+K)(Y/R)^2}} + AY^4 + BY^6 + CY^8 + DY^{10} \quad (1)$$

First Embodiment

FIG. 1 illustrates the lens structure of a zoom lens 1 according to a first embodiment of the present invention. The zoom lens 1 includes eight lenses and one prism.

The zoom lens 1 includes, in sequence from the object side to the image side, a first lens group GR1 having a weak negative refractive power, a second lens group GR2 having a negative refractive power, a third lens group GR3 having a positive refractive power, and a fourth lens group GR4 having a positive refractive power.

When changing the focal length of the zoom lens 1 from the wide angle end to the telephoto end, zooming and correction of the imaging position during zooming are performed by moving the second lens group GR2 toward the image side along a convex path and moving the third lens group GR3 monotonously toward the object side.

The first lens group GR1 includes, in sequence from the object side to the image side, a negative lens G1 having a meniscus shape with a convex surface facing the object side, a prism G2 for bending a light path, and a positive lens G3 having a biconvex shape. The negative lens G1 and the prism G2 are made of a glass material, and the positive lens G3 is made of a resin material.

The second lens group GR2 includes a cemented lens constituted by a negative lens G4 having a biconcave shape and a positive lens G5 having a meniscus shape with a concave surface facing the image side. The negative lens G4 and the positive lens G5 are made of a resin material.

The third lens group GR3 includes, in sequence from the object side to the image side, a positive lens G6 having a biconvex shape, and a cemented lens constituted by a positive lens G7 having a biconvex shape and a negative lens G8 having a biconcave shape. The positive lens G6, the positive lens G7, and the negative lens G8 are made of a glass material.

The fourth lens group GR4 includes a positive lens G9 having a meniscus shape with a concave surface facing the object side. The positive lens G9 is made of a resin material.

A seal glass SG is disposed between the fourth lens group GR4 and an image surface IMG.

Table 1 illustrates the lens data of a first numerical example in which specific values are assigned to the zoom lens 1 of the first embodiment.

TABLE 1

| Si | Ri | di | ni | vi |
|---|---|---|---|---|
| 1 | 233.083 | 0.55 | 1.847 | 23.8 |
| 2 | 9.115 | 1.47 | | |
| 3 | ∞ | 6.70 | 1.834 | 37.3 |
| 4 | ∞ | 0.40 | | |
| 5 | 65.617 (ASP) | 1.19 | 1.607 | 27.0 |
| 6 | −15.172 (ASP) | variable | | |
| 7 | −8.085 | 0.50 | 1.530 | 55.8 |
| 8 | 8.354 | 1.17 | 1.607 | 27.0 |
| 9 | 239.774 | variable | | |
| 10 | 4.262 (ASP) | 1.75 | 1.583 | 59.5 |

TABLE 1-continued

| Si | Ri | di | ni | vi |
|---|---|---|---|---|
| 11 | −10.571 (ASP) | 0.50 | | |
| 12 | 5.333 | 1.60 | 1.689 | 31.2 |
| 13 | −4.708 | 0.60 | 1.847 | 23.8 |
| 14 | 2.626 | variable | | |
| 15 | −10.648 (ASP) | 1.72 | 1.530 | 55.8 |
| 16 | −3.665 (ASP) | 1.10 | | |
| 17 | ∞ | 0.5 | 1.517 | 64.2 |
| 18 | ∞ | 0.8 | | |
| 19 | IMG | | | |

In the zoom lens 1, both surfaces (R5, R6) of the positive lens G3 in the first lens group GR1, both surfaces (R10, R11) of the positive lens G6 in the third lens group GR3, and both surfaces (R15, R16) of the positive lens G9 in the fourth lens group GR4 are aspheric. Table 2 illustrates the 4th order, the 6th order, the 8th order, and the 10th order aspheric coefficients A, B, C, and D and the conic constant K of the aspheric surfaces in the first numerical example.

In Table 2 and in other tables including the aspheric coefficients, "E-i" represents an exponential expression with base 10, that is, "$10^{-i}$". For example, "0.12345E−05" represents "$0.12345 \times 10^{-5}$".

TABLE 2

| Si | K | A | B | C | D |
|---|---|---|---|---|---|
| 5 | 0 | −4.859E−04 | −5.509E−05 | 5.996E−06 | 0 |
| 6 | 0 | −6.503E−04 | −4.962E−05 | 6.635E−06 | −3.189E−08 |
| 10 | 0 | −1.479E−03 | 5.004E−05 | −1.637E−05 | 2.944E−07 |
| 11 | 0 | 7.641E−04 | 7.094E−05 | −2.347E−05 | 1.185E−06 |
| 15 | 0 | 1.685E−03 | 0 | 0 | 0 |
| 16 | 0 | 7.058E−03 | 5.079E−05 | −2.526E−05 | 2.518E−06 |

When changing the focal length of the zoom lens 1 from the wide angle end to the telephoto end, the inter-surface distance d6 between the first lens group GR1 and the second lens group GR2, the inter-surface distance d9 between the second lens group GR2 and the third lens group GR3, and the inter-surface distance d14 between the third lens group GR3 and the fourth lens group GR4 change. Table 3 illustrates the inter-surface distances in the first numerical example in the wide angle end state, the medium focal length state, and the telephoto end state, as well as the F number Fno and the angle of view 2ω.

TABLE 3

| | WIDE ANGLE END | MEDIUM FOCAL LENGTH | TELEPHOTO END |
|---|---|---|---|
| f | 4.64 | 7.83 | 13.23 |
| Fno | 2.87 | 3.91 | 5.58 |
| 2ω | 65.3 | 38.7 | 23.8 |
| d6 | 1.35 | 3.44 | 1.35 |
| d9 | 8.81 | 3.55 | 0.65 |
| d14 | 3.80 | 6.96 | 11.96 |

Figure 2:
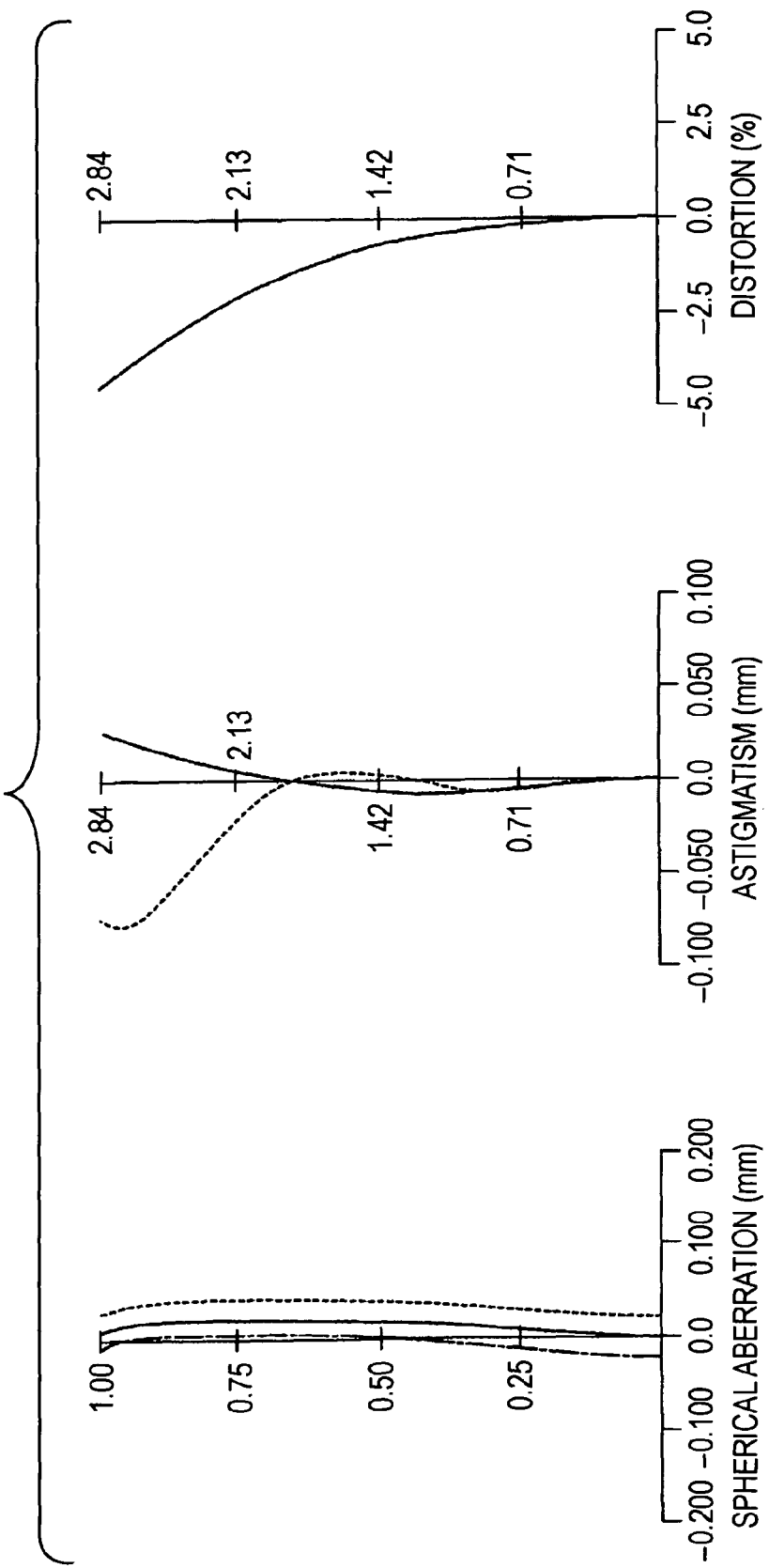
FIG. 2, as with FIGS. 3 and 4, is an aberration diagram of a numerical example to which specific values are assigned to the first embodiment, illustrating spherical aberration, astigmatism, and distortion in the wide angle end state.
Figure 3:
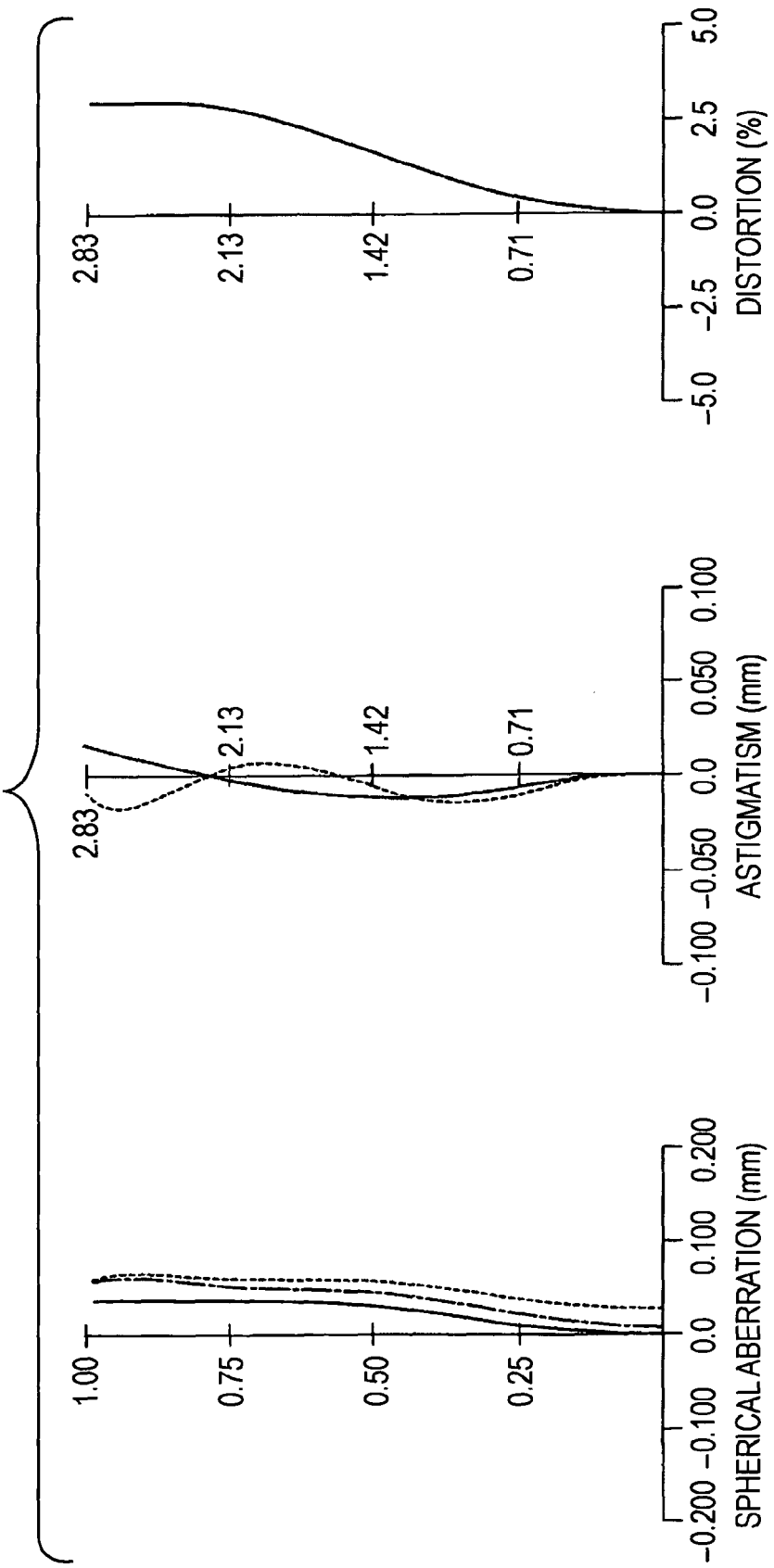
FIG. 3 is a diagram illustrating spherical aberration, astigmatism, and distortion in the medium focal length state.
Figure 4:
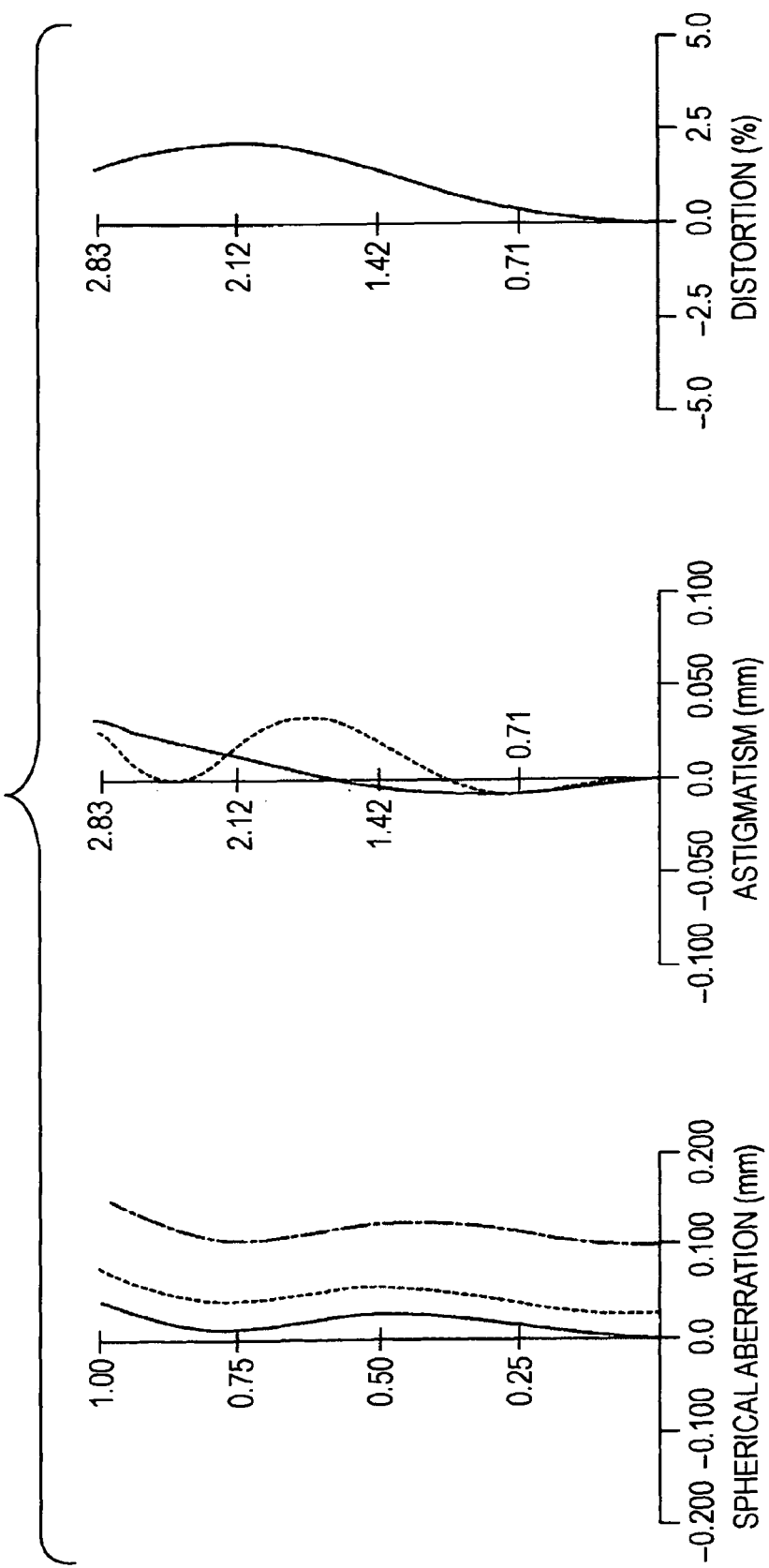
FIG. 4 is a diagram illustrating spherical aberration, astigmatism, and distortion in the telephoto end state.

FIGS. 2 to 4 illustrate aberration diagrams of the first numerical example focused on infinity, in which FIG. 2 is an aberration diagram for the wide angle end state, FIG. 3 is an aberration diagram for the medium focal length state, and FIG. 4 is an aberration diagram for the telephoto end state.

In the spherical aberration diagrams in FIGS. 2 to 4, the data for the d-line is illustrated with a solid line, the data for the g-line is illustrated with an alternate long and short dash line, and the data for C-line is illustrated with a broken line. In the astigmatism diagrams, the data for the sagittal image surface is illustrated with a solid line, and the data for the meridional image surface is illustrated with a broken line.

It is clear from the aberration diagrams that the aberrations are appropriately corrected in the first numerical example and high imaging performance is obtained.

Second Embodiment

Figure 5:
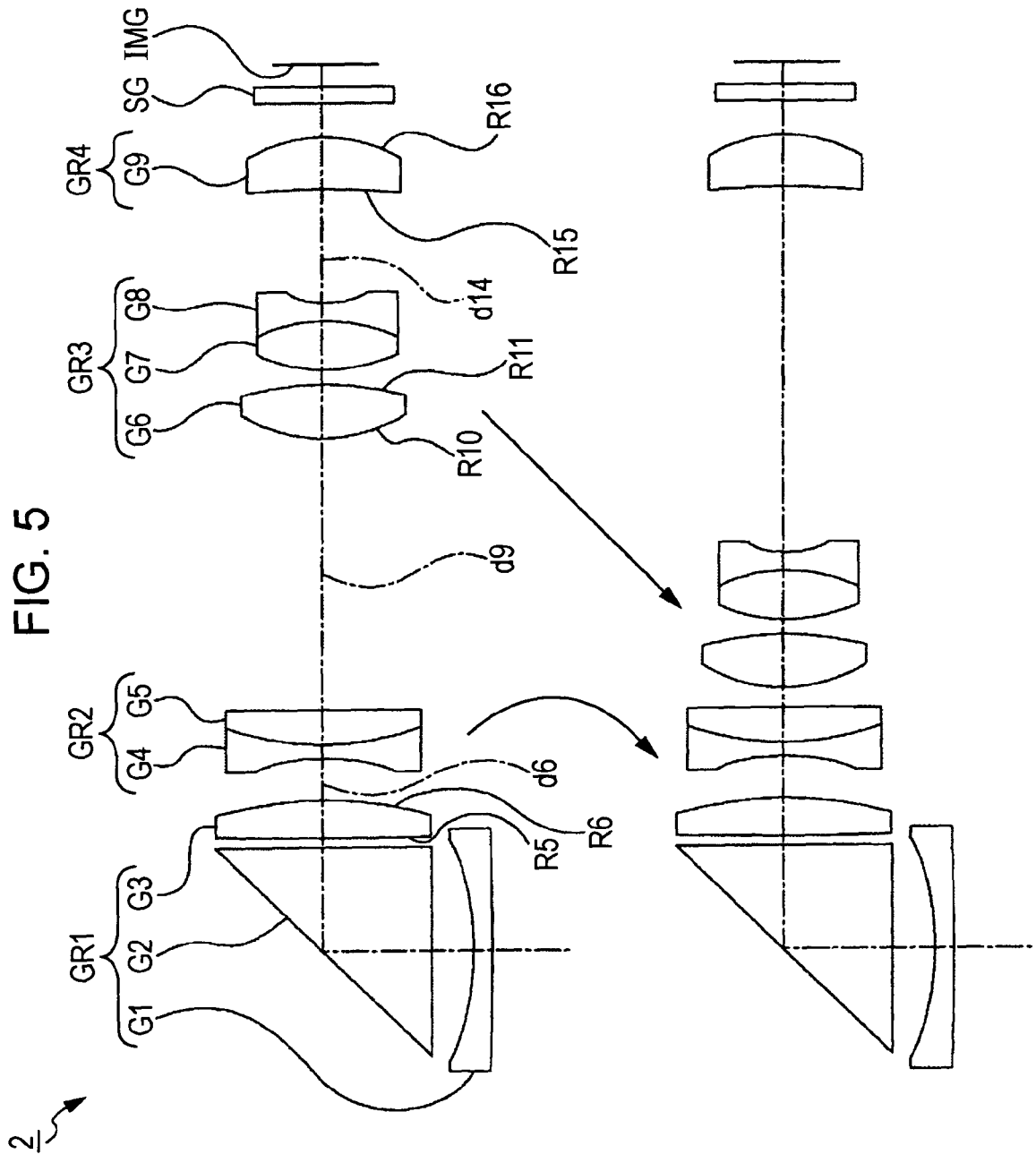
FIG. 5 illustrates the lens structure of a zoom lens according to a second embodiment of the present invention.

FIG. 5 illustrates the lens structure of a zoom lens 2 according to a second embodiment of the present invention. The zoom lens 2 includes eight lenses and one prism.

The zoom lens 2 includes, in sequence from the object side to the image side, a first lens group GR1 having a weak negative refractive power, a second lens group GR2 having a negative refractive power, a third lens group GR3 having a positive refractive power, and a fourth lens group GR4 having a positive refractive power.

When changing the focal length of the zoom lens 2 from the wide angle end to the telephoto end, zooming and correction of the imaging position during zooming are performed by moving the second lens group GR2 toward the image side along a convex path and moving the third lens group GR3 monotonously toward the object side.

The first lens group GR1 includes, in sequence from the object side to the image side, a negative lens G1 having a biconcave shape, a prism G2 for bending a light path, and a positive lens G3 having a biconvex shape. The negative lens G1 and the prism G2 are made of a glass material, and the positive lens G3 is made of a resin material.

The second lens group GR2 includes a cemented lens constituted by a negative lens G4 having a biconcave shape and a positive lens G5 having a meniscus shape with a concave surface facing the image side. The negative lens G4 and the positive lens G5 are made of a resin material.

The third lens group GR3 includes, in sequence from the object side to the image side, a positive lens G6 having a biconvex shape, and a cemented lens constituted by a positive lens G7 having a biconvex shape and a negative lens G8 having a biconcave shape. The positive lens G6, the positive lens G7, and the negative lens G8 are made of a glass material.

The fourth lens group GR4 includes a positive lens G9 having a meniscus shape with a concave surface facing the object side. The positive lens G9 is made of a resin material.

A seal glass SG is disposed between the fourth lens group GR4 and an image surface IMG.

Table 4 illustrates the lens data of a second numerical example in which specific values are assigned to the zoom lens 2 of the second embodiment.

TABLE 4

| Si | Ri | di | ni | vi |
|---|---|---|---|---|
| 1 | −1300.604 | 0.55 | 1.847 | 23.8 |
| 2 | 9.533 | 1.43 | | |
| 3 | ∞ | 6.70 | 1.834 | 37.3 |
| 4 | ∞ | 0.40 | | |
| 5 | 75.094 (ASP) | 1.26 | 1.583 | 30.0 |
| 6 | −12.743 (ASP) | variable | | |
| 7 | −7.891 | 0.50 | 1.530 | 55.8 |
| 8 | 6.044 | 1.34 | 1.583 | 30.0 |
| 9 | 113.676 | variable | | |
| 10 | 4.227 (ASP) | 1.75 | 1.583 | 59.5 |
| 11 | −10.782 (ASP) | 0.50 | | |
| 12 | 5.215 | 1.62 | 1.689 | 31.2 |
| 13 | −4.444 | 0.60 | 1.847 | 23.8 |
| 14 | 2.582 | variable | | |
| 15 | −9.460 (ASP) | 1.70 | 1.530 | 55.8 |

TABLE 4-continued

| Si | Ri | di | ni | vi |
|---|---|---|---|---|
| 16 | −3.548 (ASP) | 1.10 | | |
| 17 | ∞ | 0.5 | 1.517 | 64.2 |
| 18 | ∞ | 0.8 | | |
| 19 | IMG | | | |

In the zoom lens 2, both surfaces (R5, R6) of the positive lens G3 in the first lens group GR1, both surfaces (R10, R11) of the positive lens G6 in the third lens group GR3, and both surfaces (R15, R16) of the positive lens G9 in the fourth lens group GR4 are aspheric. Table 5 illustrates the 4th order, the 6th order, the 8th order, and the 10th order aspheric coefficients A, B, C, and D and the conic constant K of the aspheric surfaces in the second numerical example.

TABLE 5

| Si | K | A | B | C | D |
|---|---|---|---|---|---|
| 5 | 0 | −7.012E−04 | −4.620E−05 | 4.876E−06 | 0 |
| 6 | 0 | −8.232E−04 | −3.743E−05 | 5.331E−06 | −3.509E−08 |
| 10 | 0 | −1.472E−03 | 6.762E−05 | −1.869E−05 | 5.064E−07 |
| 11 | 0 | 7.856E−04 | 7.633E−05 | −2.318E−05 | 1.167E−06 |
| 15 | 0 | 2.550E−03 | 0 | 0 | 0 |
| 16 | 0 | 7.367E−03 | 3.188E−04 | −6.024E−05 | 4.537E−06 |

When changing the focal length of the zoom lens 2 from the wide angle end to the telephoto end, the inter-surface distance d6 between the first lens group GR1 and the second lens group GR2, the inter-surface distance d9 between the second lens group GR2 and the third lens group GR3, and the inter-surface distance d14 between the third lens group GR3 and the fourth lens group GR4 change. Table 6 illustrates the inter-surface distances in the second numerical example in the wide angle end state, the medium focal length state, and the telephoto end state, as well as the F number Fno and the angle of view 2ω.

TABLE 6

| | WIDE ANGLE END | MEDIUM FOCAL LENGTH | TELEPHOTO END |
|---|---|---|---|
| f | 4.64 | 7.83 | 13.23 |
| Fno | 2.87 | 3.90 | 5.60 |
| 2ω | 65.3 | 38.7 | 23.9 |
| d6 | 1.35 | 3.39 | 1.35 |
| d9 | 8.70 | 3.59 | 0.65 |
| d14 | 3.70 | 6.77 | 11.74 |

Figure 6:
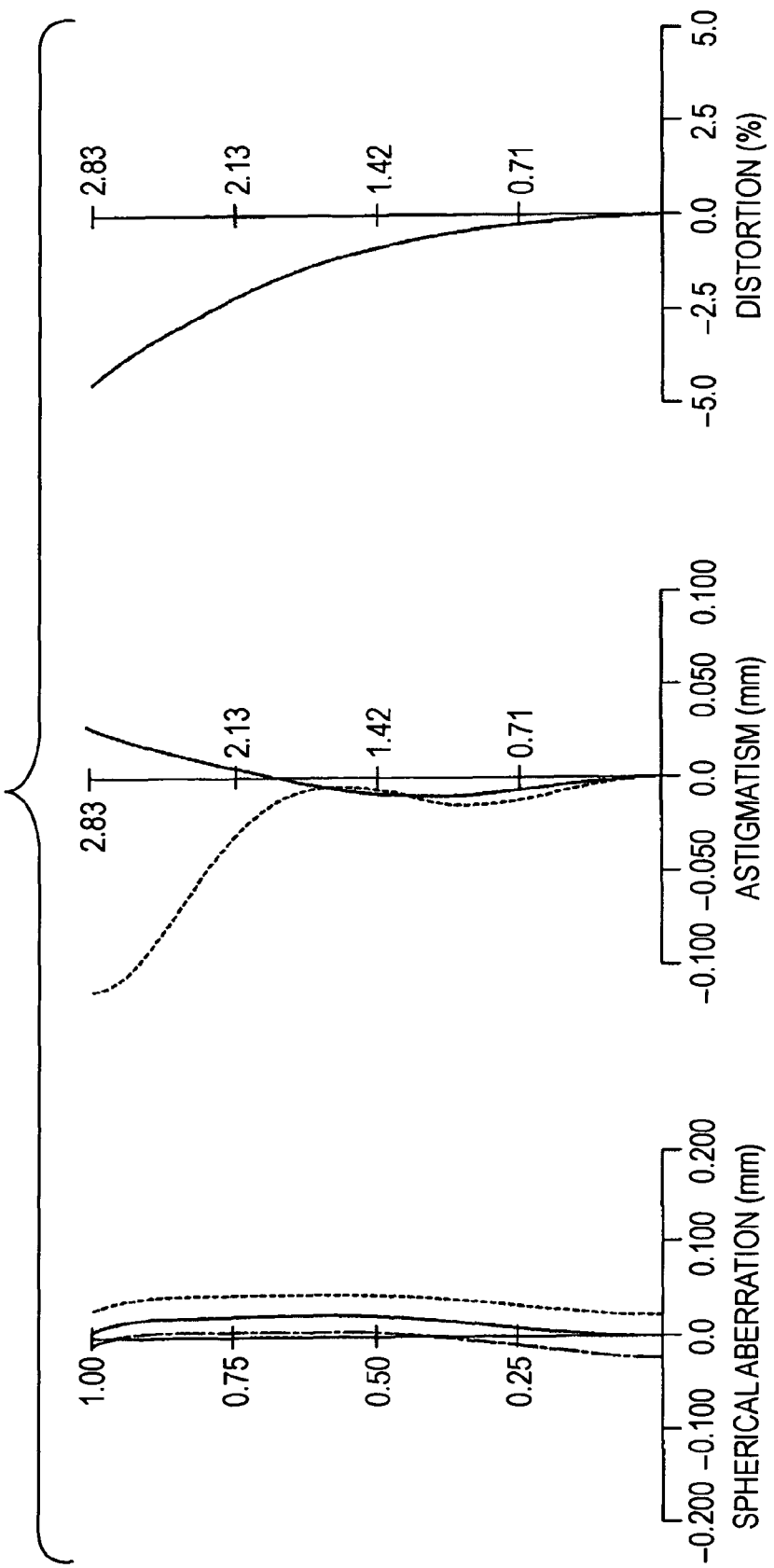
FIG. 6, as with FIGS. 7 and 8, is an aberration diagram of a numerical example to which specific values are assigned to the second embodiment, illustrating spherical aberration, astigmatism, and distortion in the wide angle end state.
Figure 7:
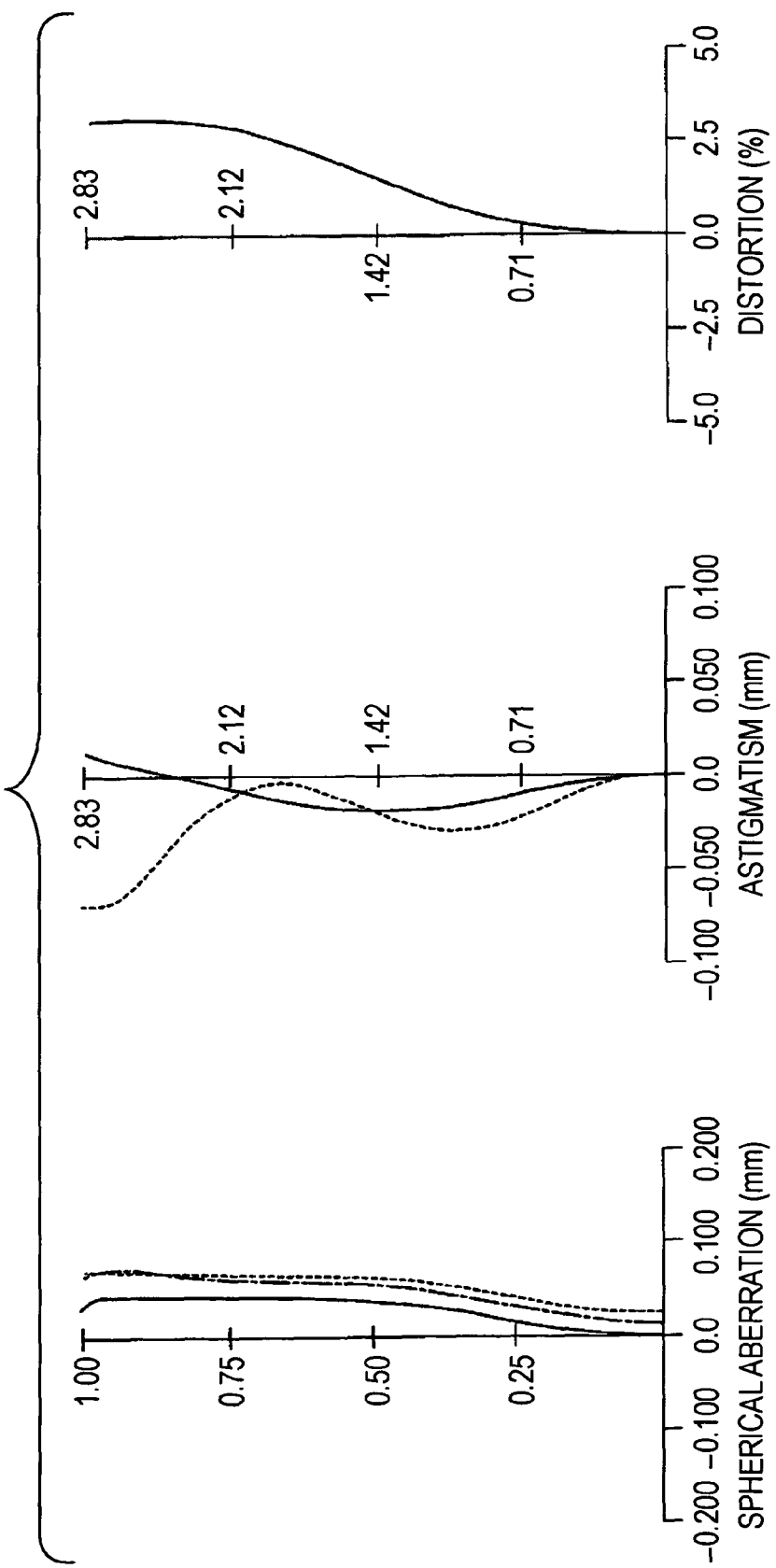
FIG. 7 is a diagram illustrating spherical aberration, astigmatism, and distortion in the medium focal length state.
Figure 8:
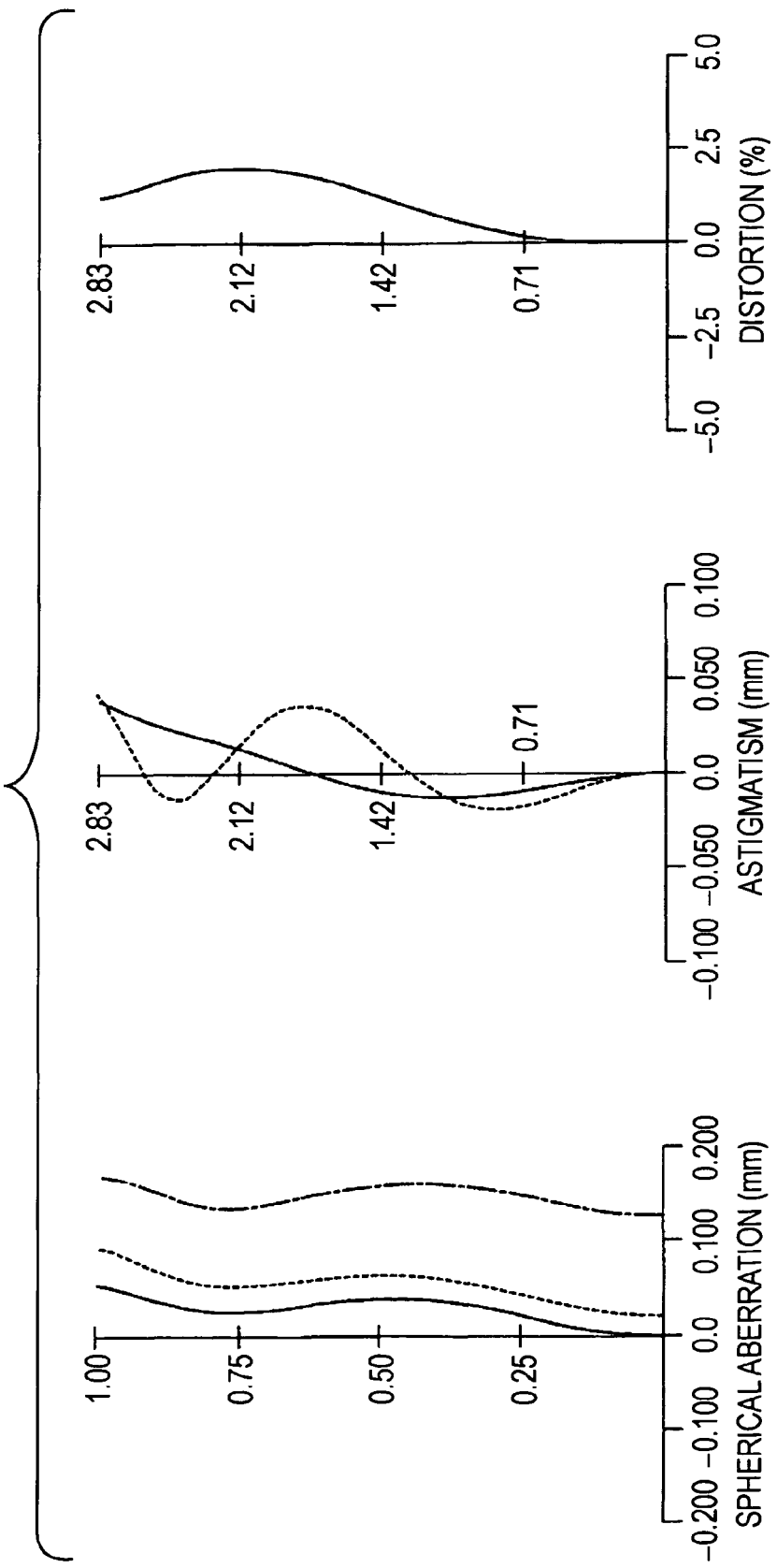
FIG. 8 is a diagram illustrating spherical aberration, astigmatism, and distortion in the telephoto end state.

FIGS. 6 to 8 illustrate aberration diagrams of the second numerical example focused on infinity, in which FIG. 6 is an aberration diagram for the wide angle end state, FIG. 7 is an aberration diagram for the medium focal length state, and FIG. 8 is an aberration diagram for the telephoto end state.

In the spherical aberration diagrams in FIGS. 6 to 8, the data for the d-line is illustrated with a solid line, the data for the g-line is illustrated with an alternate long and short dash line, and the data for C-line is illustrated with a broken line. In the astigmatism diagrams, the data for the sagittal image surface is illustrated with a solid line, and the data for the meridional image surface is illustrated with a broken line.

It is clear from the aberration diagrams that the aberrations are appropriately corrected in the second numerical example and high imaging performance is obtained.

Third Embodiment

Figure 9:
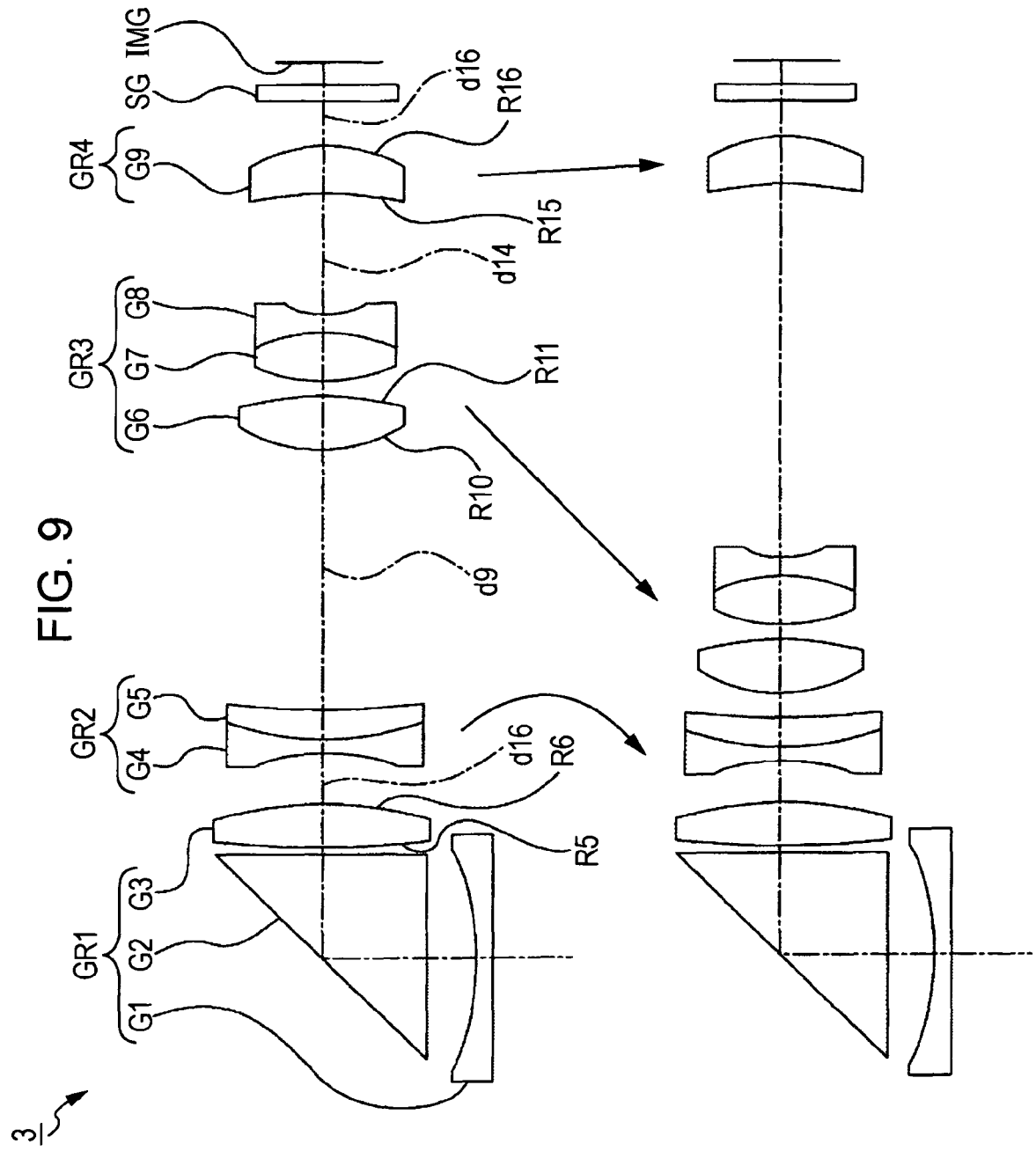
FIG. 9 illustrates the lens structure of a zoom lens according to a third embodiment of the present invention.

FIG. 9 illustrates the lens structure of a zoom lens 3 according to a third embodiment of the present invention. The zoom lens 3 includes eight lenses and one prism.

The zoom lens 3 includes, in sequence from the object side to the image side, a first lens group GR1 having a weak negative refractive power, a second lens group GR2 having a negative refractive power, a third lens group GR3 having a positive refractive power, and a fourth lens group GR4 having a positive refractive power.

When changing the focal length of the zoom lens 3 from the wide angle end to the telephoto end, zooming and correction of the imaging position during zooming are performed by moving the second lens group GR2 toward the image side along a convex path, moving the third lens group GR3 monotonously toward the object side, and moving the fourth lens group GR4 monotonously toward the image side.

The first lens group GR1 includes, in sequence from the object side to the image side, a negative lens G1 having a piano-concave shape, a prism G2 for bending a light path, and a positive lens G3 having a biconvex shape. The negative lens G1 and the prism G2 are made of a glass material, and the positive lens G3 is made of a resin material.

The second lens group GR2 includes a cemented lens constituted by a negative lens G4 having a biconcave shape and a positive lens G5 having a meniscus shape with a concave surface facing the image side. The negative lens G4 and the positive lens G5 are made of a resin material.

The third lens group GR3 includes, in sequence from the object side to the image side, a positive lens G6 having a biconvex shape, and a cemented lens constituted by a positive lens G7 having a biconvex shape and a negative lens G8 having a biconcave shape. The positive lens G6, the positive lens G7, and the negative lens G8 are made of a glass material.

The fourth lens group GR4 includes a positive lens G9 having a meniscus shape with a concave surface facing the object side. The positive lens G9 is made of a resin material.

A seal glass SG is disposed between the fourth lens group GR4 and an image surface IMG.

Table 7 illustrates the lens data of a third numerical example in which specific values are assigned to the zoom lens 3 of the third embodiment.

TABLE 7

| Si | Ri | di | ni | vi |
|----|----|----|----|----|
| 1 | ∞ | 0.55 | 1.847 | 23.8 |
| 2 | 9.421 | 1.44 | | |
| 3 | ∞ | 6.70 | 1.834 | 37.3 |
| 4 | ∞ | 0.40 | | |
| 5 | 88.969 (ASP) | 1.17 | 1.607 | 27.0 |
| 6 | −15.422 (ASP) | variable | | |
| 7 | −9.582 | 0.50 | 1.530 | 55.8 |
| 8 | 6.819 | 1.22 | 1.607 | 27.0 |
| 9 | 57.780 | variable | | |
| 10 | 4.316 (ASP) | 1.65 | 1.583 | 59.5 |
| 11 | −10.986 (ASP) | 0.50 | | |
| 12 | 5.324 | 1.58 | 1.689 | 31.2 |
| 13 | −4.609 | 0.60 | 1.847 | 23.8 |
| 14 | 2.733 | variable | | |
| 15 | −10.395 (ASP) | 1.71 | 1.530 | 55.8 |
| 16 | −3.695 (ASP) | variable | | |
| 17 | ∞ | 0.5 | 1.517 | 64.2 |
| 18 | ∞ | 0.8 | | |
| 19 | IMG | | | |

In the zoom lens 3, both surfaces (R5, R6) of the positive lens G3 in the first lens group GR1, both surfaces (R10, R11) of the positive lens G6 in the third lens group GR3, and both surfaces (R15, R16) of the positive lens G9 in the fourth lens group GR4 are aspheric. Table 8 illustrates the 4th order, the 6th order, the 8th order, and the 10th order aspheric coefficients A, B, C, and D and the conic constant K of the aspheric surfaces in the first numerical example.

TABLE 8

| Si | K | A | B | C | D |
|----|---|---|---|---|---|
| 5 | 0 | −4.547E−04 | −3.376E−05 | 4.452E−06 | 0 |
| 6 | 0 | −5.511E−04 | −2.839E−05 | 4.804E−06 | −1.811E−08 |
| 10 | 0 | −1.376E−03 | 4.993E−05 | −1.543E−05 | −1.896E−08 |
| 11 | 0 | 6.461E−04 | 8.033E−05 | −2.555E−05 | 1.083E−06 |
| 15 | 0 | −2.554E−04 | 0 | 0 | 0 |
| 16 | 0 | 5.053E−03 | 5.839E−05 | −1.728E−05 | 1.842E−06 |

When changing the focal length of the zoom lens 3 from the wide angle end to the telephoto end, the inter-surface distance d6 between the first lens group GR1 and the second lens group GR2, the inter-surface distance d9 between the second lens group GR2 and the third lens group GR3, the inter-surface distance d14 between the third lens group GR3 and the fourth lens group GR4, and the inter-surface distance d16 between the fourth lens group GR4 and the seal glass SG change. Table 9 illustrates the inter-surface distances in the third numerical example in the wide angle end state, the medium focal length state, and the telephoto end state, as well as the F number Fno and the angle of view 2ω.

TABLE 9

| | WIDE ANGLE END | MEDIUM FOCAL LENGTH | TELEPHOTO END |
|---|---|---|---|
| f | 4.64 | 7.83 | 13.22 |
| Fno | 2.86 | 3.97 | 5.64 |
| 2ω | 64.6 | 38.7 | 23.6 |
| d6 | 1.69 | 3.37 | 1.35 |
| d9 | 8.35 | 3.52 | 0.65 |
| d14 | 3.68 | 7.21 | 12.18 |
| d16 | 1.46 | 1.09 | 1.00 |

Figure 10:
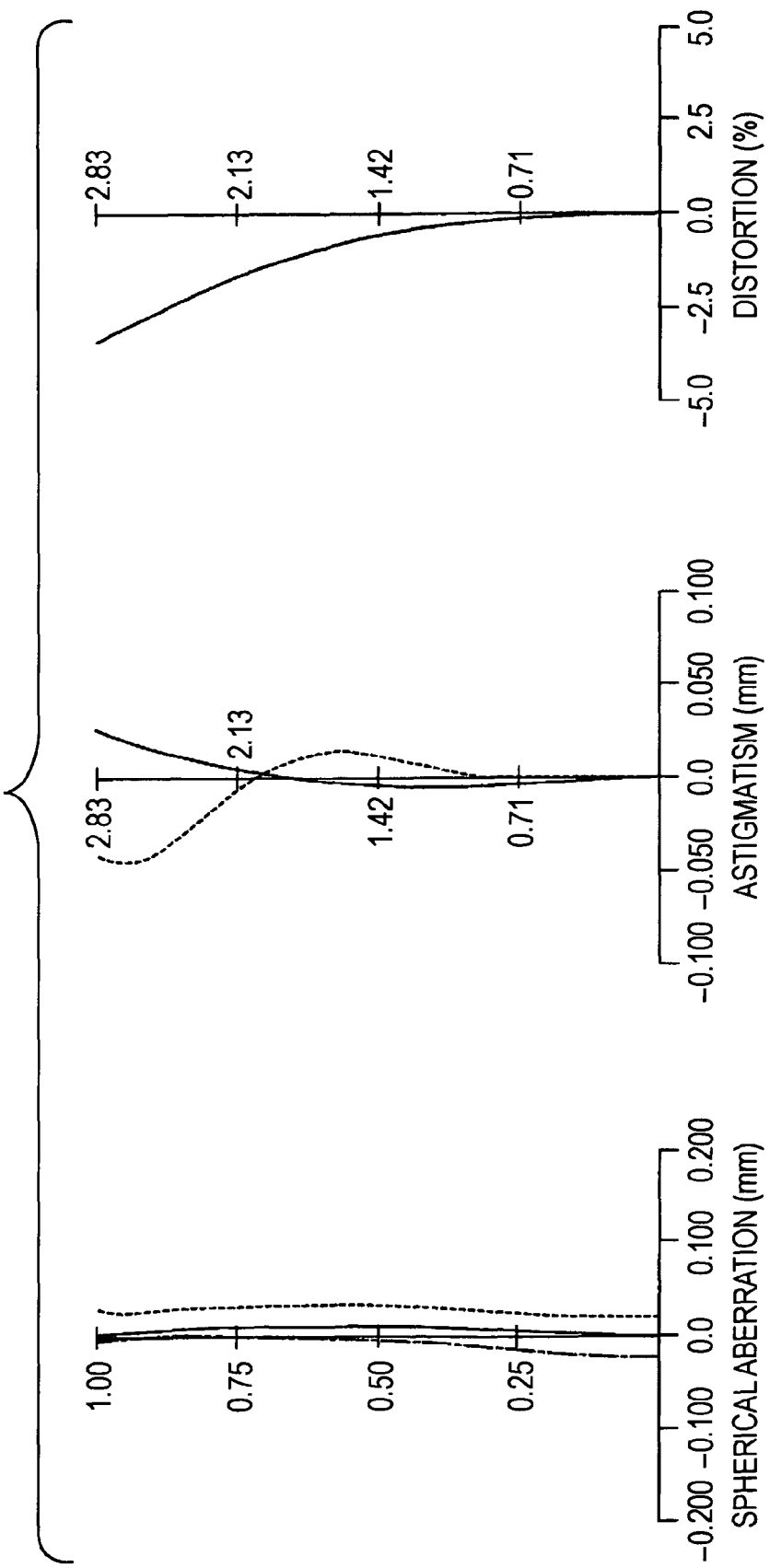
FIG. 10, as with FIGS. 11 and 12, is an aberration diagram of a numerical example to which specific values are assigned to the third embodiment, illustrating spherical aberration, astigmatism, and distortion in the wide angle end state.
Figure 11:
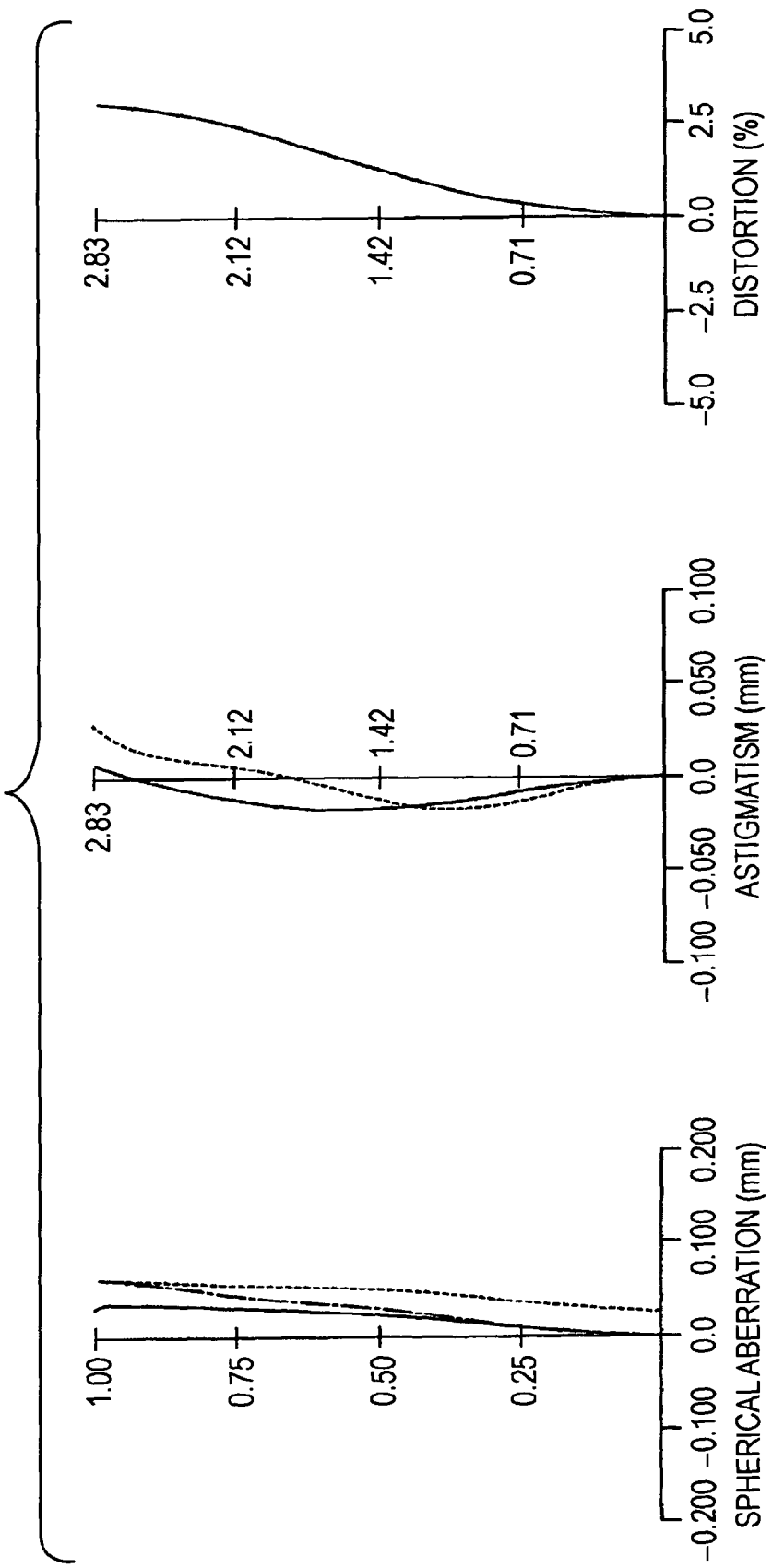
FIG. 11 is a diagram illustrating spherical aberration, astigmatism, and distortion in the medium focal length state.
Figure 12:
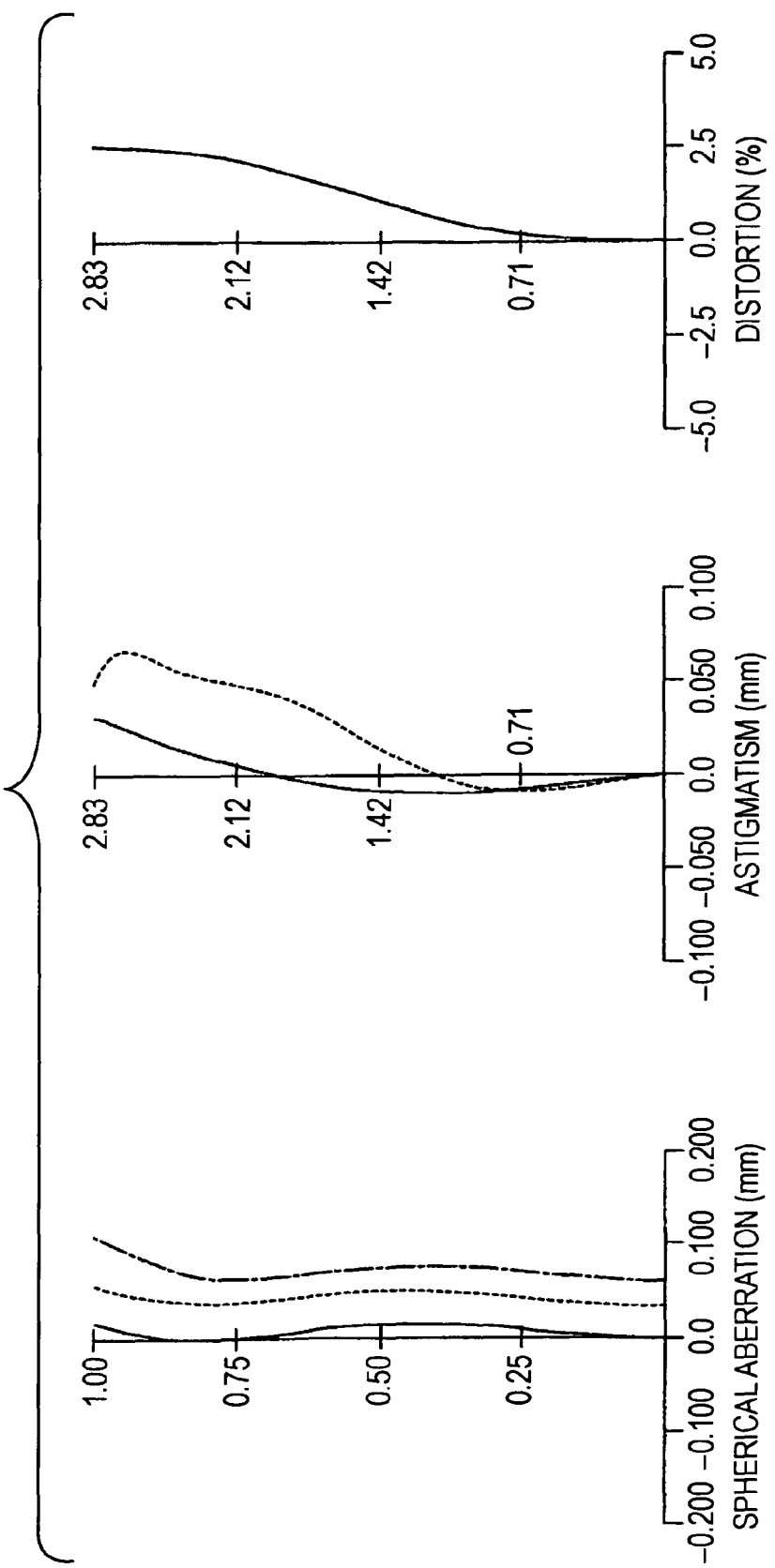
FIG. 12 is a diagram illustrating spherical aberration, astigmatism, and distortion in the telephoto end state.

FIGS. 10 to 12 illustrate aberration diagrams of the third numerical example focused on infinity, in which FIG. 10 is an aberration diagram for the wide angle end state, FIG. 11 is an aberration diagram for the medium focal length state, and FIG. 12 is an aberration diagram for the telephoto end state.

In the spherical aberration diagrams in FIGS. 10 to 12, the data for the d-line is illustrated with a solid line, the data for the g-line is illustrated with an alternate long and short dash line, and the data for C-line is illustrated with a broken line. In the astigmatism diagrams, the data for the sagittal image surface is illustrated with a solid line, and the data for the meridional image surface is illustrated with a broken line.

It is clear from the aberration diagrams that the aberrations are appropriately corrected in the third numerical example and high imaging performance is obtained.

Fourth Embodiment

Figure 13:
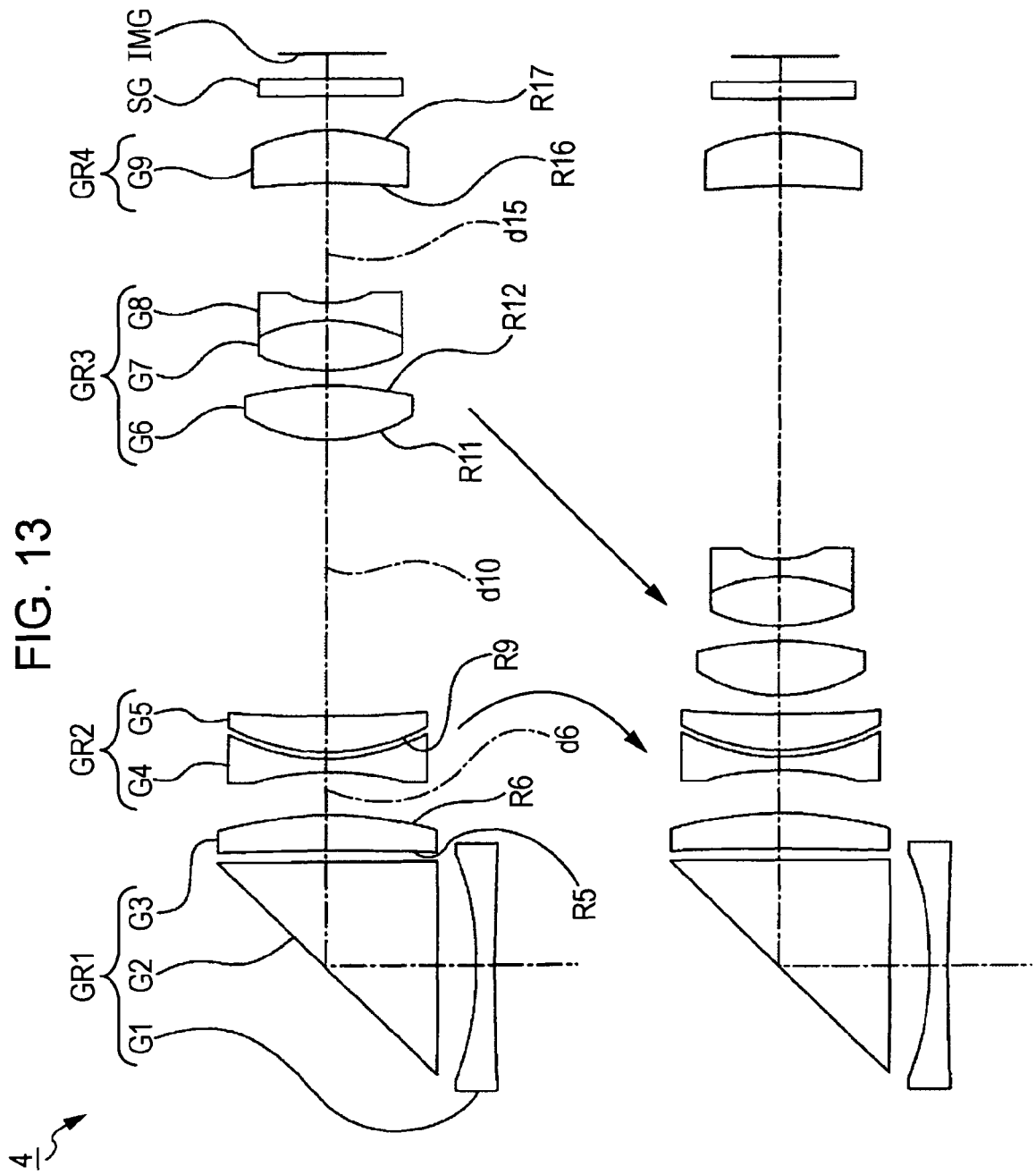
FIG. 13 illustrates the lens structure of a zoom lens according to a fourth embodiment of the present invention.

FIG. 13 illustrates the lens structure of a zoom lens 4 according to a fourth embodiment of the present invention. The zoom lens 4 includes eight lenses and one prism.

The zoom lens 4 includes, in sequence from the object side to the image side, a first lens group GR1 having a weak negative refractive power, a second lens group GR2 having a negative refractive power, a third lens group GR3 having a positive refractive power, and a fourth lens group GR4 having a positive refractive power.

When changing the focal length of the zoom lens 4 from the wide angle end to the telephoto end, zooming and correction of the imaging position during zooming are performed by moving the second lens group GR2 toward the image side on a convex path and moving the third lens group GR3 monotonously toward the object side.

The first lens group GR1 includes, in sequence from the object side to the image side, a negative lens G1 having a biconcave shape, a prism G2 for bending a light path, and a positive lens G3 having a meniscus shape with a concave surface facing the object side. The negative lens G1 and the prism G2 are made of a glass material, and the positive lens G3 is made of a resin material.

The second lens group GR2 includes a negative lens G4 having a biconcave shape and a positive lens G5 having a meniscus shape with a concave surface facing the image side. The negative lens G4 and the positive lens G5 are made of a resin material.

The third lens group GR3 includes, in sequence from the object side to the image side, a positive lens G6 having a biconvex shape, and a cemented lens constituted by a positive lens G7 having a biconvex shape and a negative lens G8 having a biconcave shape. The positive lens G6, the positive lens G7, and the negative lens G8 are made of a glass material.

The fourth lens group GR4 includes a positive lens G9 having a meniscus shape with a concave surface facing the object side. The positive lens G9 is made of a resin material.

A seal glass SG is disposed between the fourth lens group GR4 and an image surface IMG.

Table 10 illustrates the lens data of a fourth numerical example in which specific values are assigned to the zoom lens 4 of the fourth embodiment.

TABLE 10

| Si | Ri | di | ni | vi |
|---|---|---|---|---|
| 1 | −146.090 | 0.55 | 1.847 | 23.8 |
| 2 | 10.072 | 1.38 | | |
| 3 | ∞ | 6.70 | 1.834 | 37.3 |
| 4 | ∞ | 0.40 | | |
| 5 | −50.563 (ASP) | 1.19 | 1.607 | 27.0 |
| 6 | −10.480 (ASP) | variable | | |
| 7 | −11.037 | 0.50 | 1.530 | 55.8 |
| 8 | 6.949 | 0.10 | | |
| 9 | 5.597 (ASP) | 1.17 | 1.607 | 27.0 |
| 10 | 15.379 | variable | | |
| 11 | 4.264 (ASP) | 1.75 | 1.583 | 59.5 |
| 12 | −10.262 (ASP) | 0.50 | | |
| 13 | 5.389 | 1.59 | 1.689 | 31.2 |
| 14 | −4.644 | 0.60 | 1.847 | 23.8 |
| 15 | 2.618 | variable | | |
| 16 | −13.492 (ASP) | 1.71 | 1.530 | 55.8 |
| 17 | −3.987 (ASP) | 1.10 | | |
| 18 | ∞ | 0.5 | 1.517 | 64.2 |
| 19 | ∞ | 0.8 | | |
| 20 | IMG | | | |

In the zoom lens 4, both surfaces (R5, R6) of the positive lens G3 in the first lens group GR1, a surface (R9) of the positive lens G5 in the second lens group GR2 facing the object side, both surfaces (R11, R12) of the positive lens G6 in the third lens group GR3, and both surfaces (R16, R17) of the positive lens G9 in the fourth lens group GR4 are aspheric. Table 11 illustrates the 4th order, the 6th order, the 8th order, and the 10th order aspheric coefficients A, B, C, and D and the conic constant K of the aspheric surfaces in the fourth numerical example.

TABLE 11

| Si | K | A | B | C | D |
|---|---|---|---|---|---|
| 5 | 0 | 5.365E−05 | −6.168E−05 | 4.093E−06 | 0 |
| 6 | 0 | 4.593E−05 | −6.732E−05 | 5.150E−06 | −4.806E−08 |
| 9 | 0 | −4.214E−04 | −4.673E−05 | 4.789E−06 | −3.318E−07 |
| 11 | 0 | −1.518E−03 | 3.810E−05 | −1.652E−05 | 5.423E−08 |
| 12 | 0 | 7.171E−04 | 7.070E−05 | −2.742E−05 | 1.380E−06 |
| 16 | 0 | 1.133E−03 | 0 | 0 | 0 |
| 17 | 0 | 6.187E−03 | −1.601E−04 | 5.147E−06 | 4.733E−07 |

When changing the focal length of the zoom lens 4 from the wide angle end to the telephoto end, the inter-surface distance d6 between the first lens group GR1 and the second lens group GR2, the inter-surface distance d10 between the second lens group GR2 and the third lens group GR3, and the inter-surface distance d15 between the third lens group GR3 and the fourth lens group GR4 change. Table 12 illustrates the inter-surface distances in the first numerical example in the wide angle end state, the medium focal length state, and the telephoto end state, as well as the F number Fno and the angle of view $2\omega$.

TABLE 12

| | WIDE ANGLE END | MEDIUM FOCAL LENGTH | TELEPHOTO END |
|---|---|---|---|
| f | 4.63 | 3.83 | 13.23 |
| Fno | 2.86 | 3.92 | 5.58 |
| 2ω | 65.3 | 38.7 | 23.8 |
| d6 | 1.35 | 3.48 | 1.35 |
| d10 | 8.84 | 3.51 | 0.65 |
| d15 | 3.77 | 6.96 | 11.95 |

Figure 14:
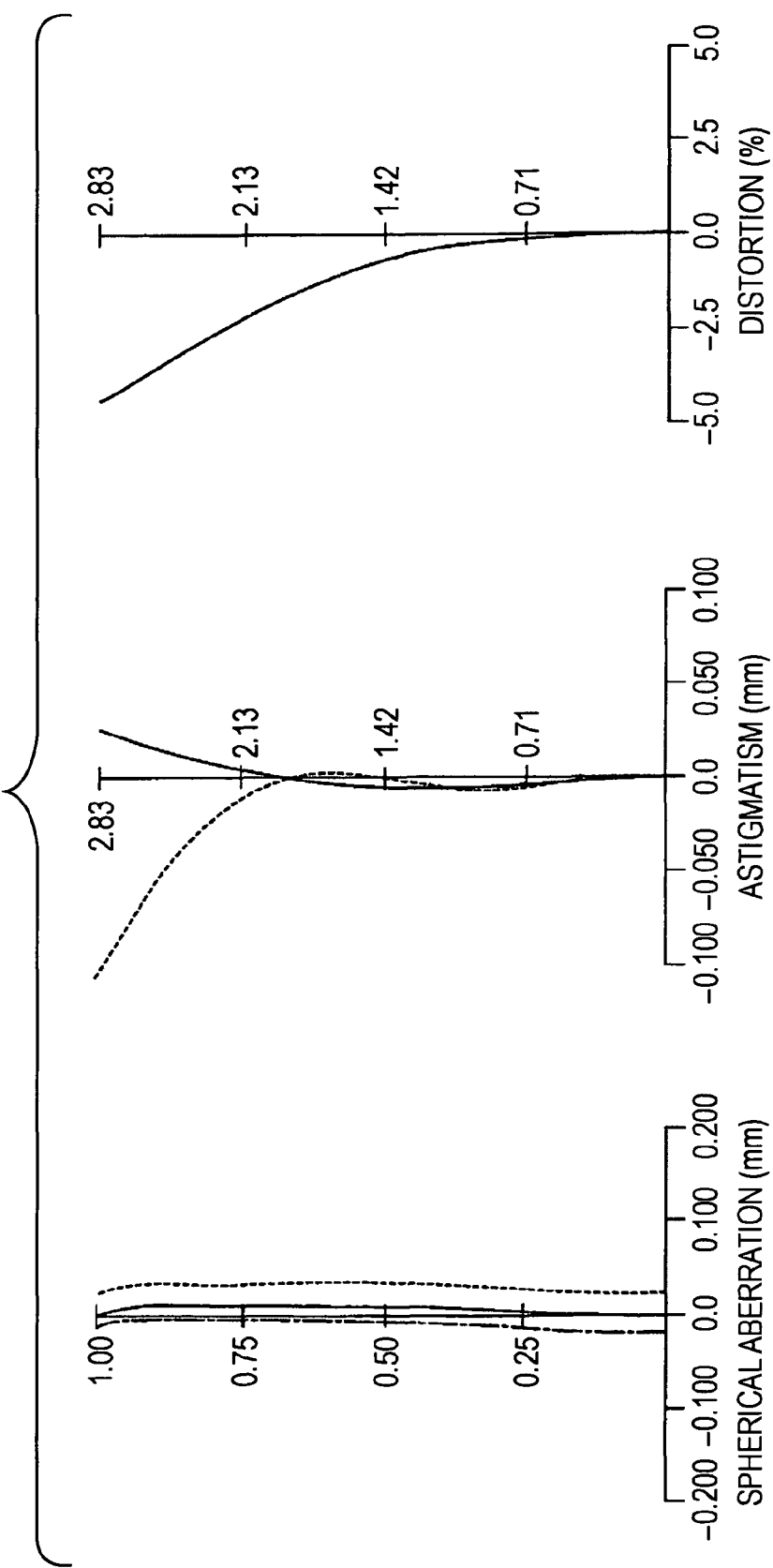
FIG. 14, as with FIGS. 15 and 16, is an aberration diagram of a numerical example to which specific values are assigned to the fourth embodiment, illustrating spherical aberration, astigmatism, and distortion in the wide angle end state.
Figure 15:
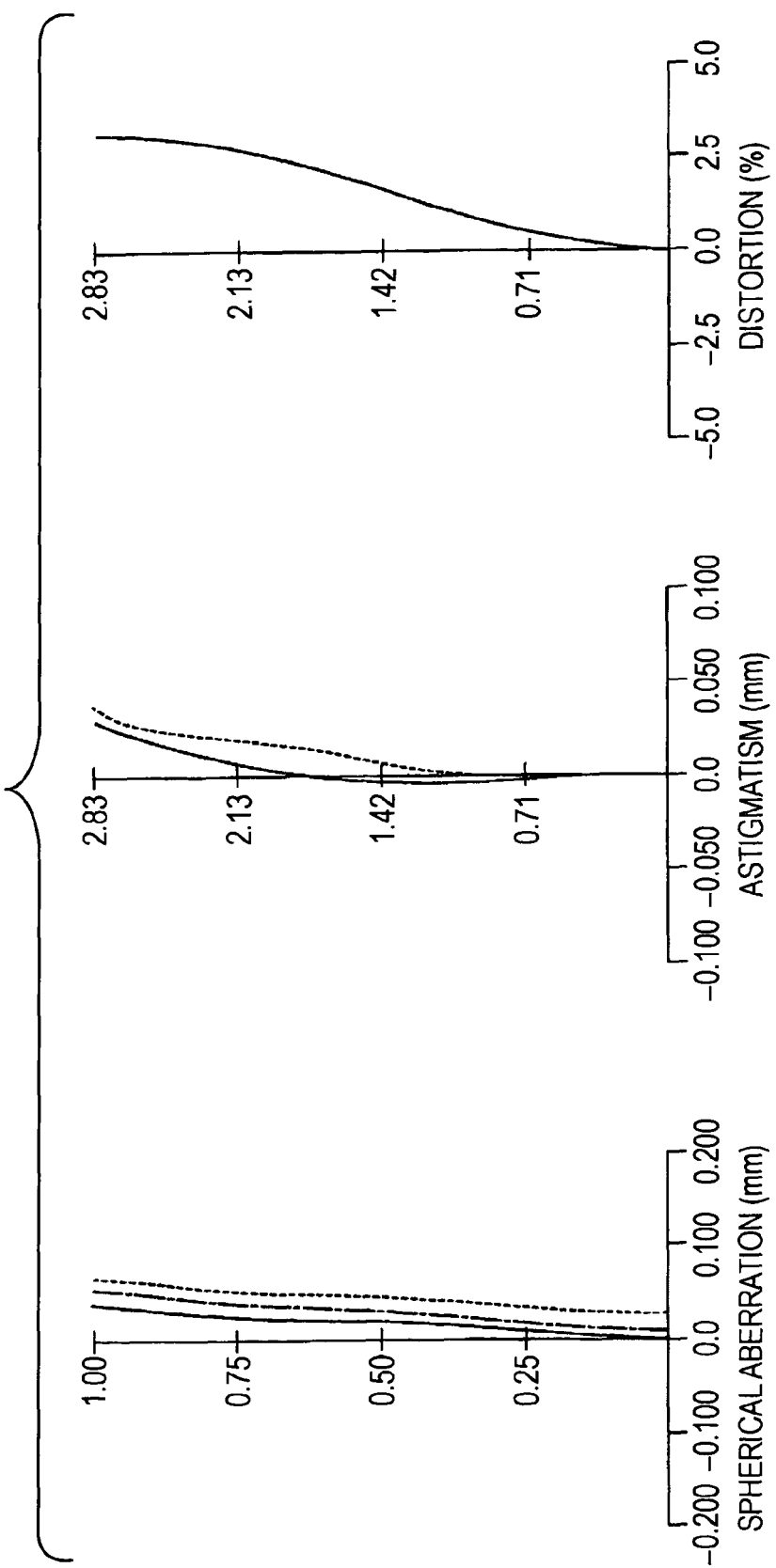
FIG. 15 is a diagram illustrating spherical aberration, astigmatism, and distortion in the medium focal length state.
Figure 16:
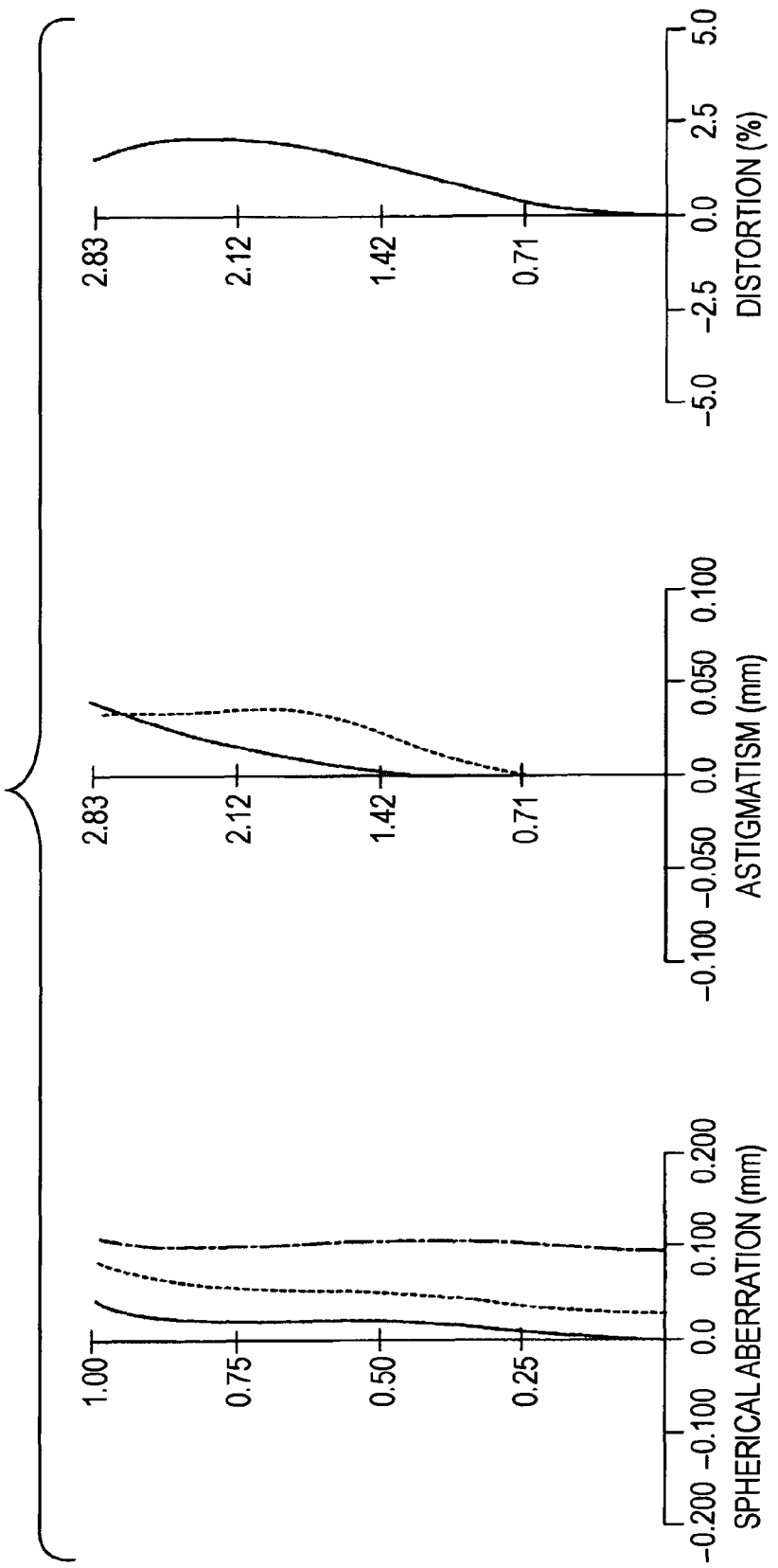
FIG. 16 is a diagram illustrating spherical aberration, astigmatism, and distortion in the telephoto end state.

FIGS. 14 to 16 illustrate aberration diagrams of the fourth numerical example focused on infinity, in which FIG. 14 is an aberration diagram for the wide angle end state, FIG. 15 is an aberration diagram for the medium focal length state, and FIG. 16 is an aberration diagram for the telephoto end state.

In the spherical aberration diagrams in FIGS. 14 to 16, the data for the d-line is illustrated with a solid line, the data for the g-line is illustrated with an alternate long and short dash line, and the data for C-line is illustrated with a broken line. In the astigmatism diagrams, the data for the sagittal image surface is illustrated with a solid line, and the data for the meridional image surface is illustrated with a broken line.

It is clear from the aberration diagrams that the aberrations are appropriately corrected in the fourth numerical example and high imaging performance is obtained.

Values of Conditional Expressions for Zoom Lens

Values of the conditional expressions for the zoom lens according to the embodiments of the present invention zoom lens will be described.

Table 13 illustrates values of the conditional expressions (1) to (6) for the zoom lenses 1 to 4.

TABLE 13

| | | ZOOM LENS 1 | ZOOM LENS 2 | ZOOM LENS 3 | ZOOM LENS 4 |
|---|---|---|---|---|---|
| | f12 | 20.414 | 18.786 | 21.745 | 21.538 |
| | fw | 4.6352 | 4.6356 | 4.6354 | 4.6348 |
| CONDITIONAL EXPRESSION (1) | f12/fw | 4.40 | 4.05 | 4.69 | 4.65 |
| | f2 | −17.001 | −15.702 | −18.232 | −18.196 |
| CONDITIONAL EXPRESSION | f2/fw | −3.67 | −3.39 | −3.93 | −3.93 |

TABLE 13-continued

|  |  | ZOOM LENS 1 | ZOOM LENS 2 | ZOOM LENS 3 | ZOOM LENS 4 |
|---|---|---|---|---|---|
| CONDITIONAL EXPRESSION (3) | f12/f2 | −1.20 | −1.20 | −1.19 | −1.18 |
|  | vd21 | 55.84 | 55.84 | 55.84 | 55.84 |
|  | vd22 | 27.00 | 30.00 | 27.00 | 27.00 |
| CONDITIONAL EXPRESSION (4) | vd21 − vd22 | 28.84 | 25.84 | 28.84 | 28.84 |
|  | β3W | −0.592 | −0.591 | −0.614 | −0.592 |
|  | β3T | −1.683 | 1.680 | −1.651 | −1.684 |
| CONDITIONAL EXPRESSION (5) | β3W · β3T | 1.00 | 0.99 | 1.01 | 1.00 |
|  | f22 | 14.23 | 10.90 | 12.62 | 13.87 |
| CONDITIONAL EXPRESSION (6) | f22/fw | 3.07 | 2.35 | 2.72 | 2.99 |

It is clear from Table 13 that the zoom lenses 1 to 4 satisfy the conditional expressions (1) to (6).

Structure of Image Pickup Apparatus

An image pickup apparatus according to an embodiment of the present invention will be described.

The image pickup apparatus according to the embodiment of the present invention includes a zoom lens and an image pickup device that converts an optical image formed by the zoom lens to an electrical signal.

In the image pickup apparatus according to the embodiment of the present invention, the zoom lens includes, in sequence from the object side to the image side, a first lens group, a second lens group having a negative refractive power, a third lens group having a positive refractive power, and a fourth lens group having a positive refractive power. Zooming and correction of the imaging position during zooming are performed by moving at least one of the second lens group and the third lens group.

Because the zoom lens has such refractive power arrangement, the total optical length and the size of the image pickup apparatus are reduced.

The first lens group is fixed during zooming. A seal glass for protecting an image pickup device is disposed between the fourth lens group and the image surface.

With the zoom lens included in the image pickup apparatus according to the embodiment of the present invention, zooming and correction of the imaging position during zooming can be performed by moving the second and third lens groups, or by moving the second, third, and fourth lens groups.

In the zoom lens included in the image pickup apparatus according to the embodiment of the present invention, the first lens group includes, in sequence from the object side to the image side, a single lens having a negative refractive power, a prism for bending a light path, and a single lens having a positive refractive power and made of a resin material.

Because the first lens group has this structure, movable lens groups are moved during zooming along the optical axis of the single lens having a positive refractive power included in the first lens group, whereby the thickness of the zoom lens along the optical axis of an incident light beam can be reduced.

In the zoom lens included in the image pickup apparatus according to the embodiment of the present invention, the second lens group includes, in sequence from the object side to the image side, one lens having a negative refractive power and made of a resin material and one lens having a positive refractive power and made of a resin material.

Because the second lens group has this structure and the zoom lens satisfies the conditional expressions (1) to (4) described below, high optical performance is secured, an increase in production cost is suppressed, and degradation of optical property due to variation in the ambient temperature can be suppressed.

Because the second lens group includes one lens having a negative refractive power and one lens having a positive refractive power as described above, chromatic aberration, in particular, transverse chromatic aberration at the wide angle end and longitudinal chromatic aberration at the telephoto end are appropriately corrected.

The zoom lens included in the image pickup apparatus according to the embodiment of the present invention satisfies the following conditional expressions $$f12/fw > 2.0, \quad (1)$$

$$f2/fw < -2.0, \quad (2)$$

$$-2.0 \leq f12/f2 \leq -0.5, \text{ and} \quad (3)$$

$$vd21 - vd22 > 20, \quad (4)$$

where f12 is the focal length of the single lens having a positive refractive power included in the first lens group, f2 is the focal length of the second lens group, fw is the focal length of the total lens system at the wide angle end, vd21 is the Abbe number of the lens having a negative refractive power included in the second lens group for the d-line, and vd22 is the Abbe number of the lens having a positive refractive power included in the second lens group for the d-line.

The conditional expression (1) represents the ratio of the focal length of the single lens having a positive refractive power included in the first lens group to the focal length of the total lens system at the wide angle end, and limits the refractive power of the single lens having a positive refractive power included in the first lens group.

If the conditional expression (1) is not satisfied, the refractive power of the lens made of a resin material (the single lens having a positive refractive power included in the first lens group) is too high. In this case, it is difficult to secure high optical performance, because the optical property (the index of refraction and the Abbe number) of a resin material varies comparatively widely.

Therefore, because the zoom lens included in the image pickup apparatus satisfies the conditional expression (1), high optical performance is secured even when a lens made of a resin material is used.

The conditional expression (2) represents the ratio of the focal length of the second lens group to the focal length of the total lens system at the wide angle end, and limits the refractive power of the second lens group.

If the conditional expression (2) is not satisfied, the refractive power of the lens group made of a resin material (the second lens group) is too high. In this case, it is difficult to secure high optical performance, because the optical property (the index of refraction and the Abbe number) of a resin material varies comparatively widely.

Therefore, because the zoom lens included in the image pickup apparatus satisfies the conditional expression (2), high optical performance is secured even when a lens made of a resin material is used.

The conditional expression (3) represents the ratio of the focal length of the single lens having a positive refractive power included in the first lens group to the focal length of the second lens group, and limits the balance of refractive power.

If the conditional expression (3) is not satisfied, the balance of aberration correction is disturbed when the ambient temperature varies, so that the optical performance deteriorates and it becomes difficult to maintain high optical performance compatible with an image pickup device having a high pixel count.

Therefore, because the zoom lens included in the image pickup apparatus satisfies the conditional expression (3), high optical performance is maintained even when the single lens having a positive refractive power included in the first lens group and the lenses included in the second lens group are made of a resin material and the ambient temperature varies.

The conditional expression (4) represents the difference between the Abbe number of the lens having a negative refractive power included in the second lens group for the d-line and the Abbe number of the lens having a positive refractive power included in the second lens group for the d-line, and specifies a condition for appropriately correcting chromatic aberration generated in the second lens group.

If the conditional expression (4) is not satisfied, it becomes difficult to correct chromatic aberration, in particular, transverse chromatic aberration at the wide angle end and longitudinal chromatic aberration at the telephoto end.

Therefore, because the zoom lens included in the image pickup apparatus satisfies the conditional expression (4), chromatic aberration generated in the second lens group, in particular, transverse chromatic aberration at the wide angle end and longitudinal chromatic aberration at the telephoto end are appropriately corrected, so that the optical performance can be improved.

The production cost of the image pickup apparatus according to the embodiment of the present invention can be reduced, because, in the zoom lens included in the image pickup apparatus, a lens disposed nearest to the image in the first lens group and two lenses in the second lens group are made of a resin material as described above.

Moreover, the lens disposed nearest to the image in the first lens group has a positive refractive power, and the second lens group has a negative refractive power. The ratio of the focal length of the lens disposed nearest to the image in the first lens group to the focal length of the second lens group is limited to a small value within the range of 0.5 to 2 as shown by the conditional expression (3).

Because the lens disposed nearest to the image in the first lens group has a positive refractive power and the second lens group has a negative refractive power, and the ratio between the focal lengths thereof is limited to a small value, deterioration of the performance due to variation in the ambient temperature is suppressed. That is, variation in aberration, which is generated in one of the second lens group and the lens disposed nearest to the image in the first lens group owing to variation in the ambient temperature, is prevented from being generated in the other one of the lens and the lens group, whereby high optical performance is secured.

Therefore, the production cost of the image pickup apparatus is reduced by using the lenses made of a resin material, and deterioration of the optical performance due to variation in the ambient temperature is suppressed, so that high optical performance can be secured.

In the zoom lens included in the image pickup apparatus according to the embodiment of the present invention, a lens disposed on the image side in the second lens group has a meniscus shape that is convex toward the object side and concave toward the image side. Therefore, distortion can be appropriately corrected.

Embodiment of Image Pickup Apparatus

Figure 17:
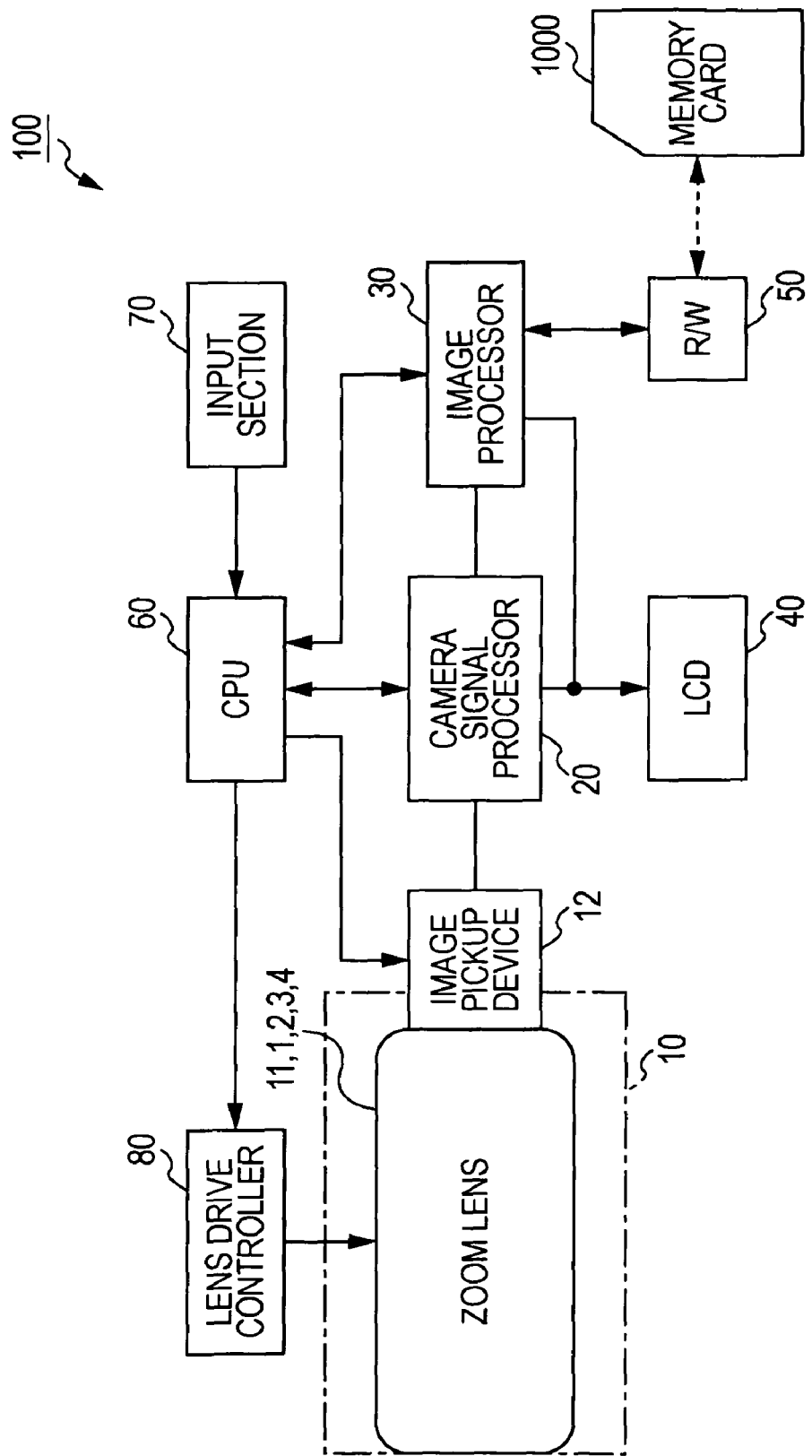
FIG. 17 is a block diagram of an image pickup apparatus according to an embodiment of the present invention.

FIG. 17 is a block diagram of a digital still camera, which is an image pickup apparatus according to an embodiment of present invention.

An image pickup apparatus (digital still camera.) 100 includes a camera block 10 for taking an image, a camera signal processor 20 for performing signal processing such as analog-digital conversion of an image signal that has been obtained, an image processor 30 for recording and reproducing the image signal, a liquid crystal display (LCD) 40 for displaying the image, a reader/writer (R/W) 50 for writing the image signal to and reading the image signal from a memory card 1000, a central processing unit (CPU) 60 for controlling the image pickup apparatus, an input section 70 including various switches and the like with which a user performs input operations, and a lens drive controller 80 for controlling driving of the lenses disposed in the camera block 10.

The camera block 10 includes an optical system including a zoom lens 11 (the zoom lens 1, 2, 3, or 4 according an embodiment of the present invention) and an image pickup device 12 such as a charge coupled device (CCD) or a complementary metal-oxide semiconductor (CMOS) device.

The camera signal processor 20 performs signal processing of an output signal from the image pickup device 12, such as analog-digital conversion, removal of noise, correction of image quality, and conversion to brightness signal and color-difference signal.

The image processor 30 performs processing such as encoding and decoding of an image signal on the basis of a predetermined image data format and conversion of data specifications such as resolution.

The LCD 40 displays various data, such as a state of user input to the input section 70 and data of an image that has been taken.

The R/W 50 writes an image data, which has been encoded by the image processor 30, to the memory card 1000 and reads an image data recorded in the memory card 1000.

The CPU 60 functions as a control processor for controlling the circuit blocks included in the image pickup apparatus 100 on the basis of, for example, an input command signal output from the input section 70.

The input section 70 includes, for example, a shutter release button for operating the shutter and a selection switch for selecting an operation mode. The input section 70 outputs a command signal corresponding to a user operation to the CPU 60.

The lens drive controller 80 controls, for example, a motor (not shown) that drives the lenses in the zoom lens 11 on the basis of a control signal from the CPU 60.

The memory card 1000, for example, is a semiconductor memory that can be inserted into and removed from a slot connected to the R/W 50.

Operation of the image pickup apparatus 100 will be described below.

In a shooting-standby mode, under the control of the CPU 60, an image signal taken by the camera block 10 is output to the LCD 40 through the camera signal processor 20, and the image signal is displayed on the LCD 40 as a camera-through image. When a command signal for zooming is input to the input section 70, the CPU 60 outputs a control signal to the lens drive controller 80, so that a predetermined lens in the zoom lens 11 is moved.

When the shutter (not shown) in the camera block 10 is released in accordance with a command signal from the input section 70, an image signal is taken and output from the camera signal processor 20 to the image processor 30 so as to be encoded and converted to digital data in a predetermined format. The converted data is output to the R/W 50 and recorded in the memory card 1000.

The lens drive controller 80 performs focusing by moving a predetermined lens in the zoom lens 11 on the basis of a control signal from the CPU 60 when, for example, the shutter release button in the input section 70 is halfway depressed or fully depressed for recording (shooting).

When reproducing an image data recorded in the memory card 1000, the R/W 50 reads predetermined image data from the memory card 1000 in accordance with an operation performed on the input section 70, the image processor 30 uncompresses and decodes the image data, the image signal is output to the LCD 40, and a reproduction image is displayed on the LCD 40.

In the embodiment described above, the image pickup apparatus is applied to a digital still camera. However, the image pickup apparatus is applicable not only to a digital still camera, but also, for example, to a camera unit of a digital apparatus such as a digital video camera, a camera-equipped mobile phone, or a camera-equipped personal digital assistant (PDA).

The shapes of the components and values described in the embodiments are examples for carrying out the present invention, and they do not limit the technical scope of the present invention.

The present application contains subject matter related to that disclosed in Japanese Priority Patent Application JP 2009-139419 filed in the Japan Patent Office on Jun. 10, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents there of.

What is claimed is:

1. A zoom lens comprising, in sequence from the object side to the image side:
    a first lens group;
    a second lens group having a negative refractive power;
    a third lens group having a positive refractive power; and
    a fourth lens group having a positive refractive power,
    wherein zooming and correction of an imaging position during zooming are performed by moving at least one of the second lens group and the third lens group,
    wherein the first lens group includes, in sequence from the object side to the image side, a single lens having a negative refractive power, a prism for bending a light path, and a single lens having a positive refractive power and made of a resin material,
    wherein the second lens group includes, in sequence from the object side to the image side, one lens having a negative refractive power and made of a resin material and one lens having a positive refractive power and made of a resin material, and
    wherein the following conditional expressions $$f12/fw>2.0, \quad (1)$$

$$f2/fw<-2.0, \quad (2)$$

$$-2.0 \leq f12/f2 \leq -0.5, \text{ and} \quad (3)$$

$$vd21-vd22>20 \quad (4)$$

are satisfied, where f12 is a focal length of the single lens having a positive refractive power included in the first lens group, f2 is a focal length of the second lens group, fw is a focal length of the total lens system at a wide angle end, vd21 is an Abbe number of the lens having a negative refractive power included in the second lens group for the d-line, and vd22 is an Abbe number of the lens having a positive refractive power included in the second lens group for the d-line.

2. The zoom lens according to claim 1,
    wherein the third lens group includes at least one lens having a positive refractive power and at least one lens having a negative refractive power,
    wherein, in the third lens group, the at least one lens having a positive refractive power is disposed nearest to an object,
    wherein, in the third lens group, the at least one lens having a negative refractive power is disposed nearest to an image, and
    wherein the following conditional expression $$0.9<\beta3W\cdot\beta3T<1.1 \quad (5)$$

is satisfied, where $\beta3W$ is a lateral magnification of the third lens group at the wide angle end with respect to an object at infinity, and $\beta3T$ is a lateral magnification of the third lens group at the telephoto end with respect to an object at infinity.

3. The zoom lens according to claim 1,
    wherein the following conditional expression $$1.7<f22/fw<3.1 \quad (6)$$

is satisfied, where f22 is a focal length of the lens having a positive refractive power included in the second lens group.

4. The zoom lens according to claim 2,
    wherein the following conditional expression $$1.7<f22/fw<3.1 \quad (6)$$

is satisfied, where f22 is a focal length of the lens having a positive refractive power included in the second lens group.

5. The zoom lens according to claim 1,
    wherein the lens having a negative refractive power included in the second lens group and the lens having a positive refractive power included in the second lens group are cemented to each other.

6. The zoom lens according to claim 2,
    wherein the lens having a negative refractive power included in the second lens group and the lens having a positive refractive power included in the second lens group are cemented to each other.

7. The zoom lens according to claim 3,
    wherein the lens having a negative refractive power included in the second lens group and the lens having a positive refractive power included in the second lens group are cemented to each other.

8. The zoom lens according to claim 4,
    wherein the lens having a negative refractive power included in the second lens group and the lens having a positive refractive power included in the second lens group are cemented to each other.

9. An image pickup apparatus comprising:
    a zoom lens; and
    an image pickup device that converts an optical image formed by the zoom lens to an electrical signal,
    wherein the zoom lens includes, in sequence from the object side to the image side,
    a first lens group,
    a second lens group having a negative refractive power,
    a third lens group having a positive refractive power, and
    a fourth lens group having a positive refractive power,
    wherein zooming and correction of an imaging position during zooming are performed by moving at least one of the second lens group and the third lens group, wherein the first lens group includes, in sequence from the object side to the image side, a single lens having a negative refractive power, a prism for bending a light path, and a single lens having a positive refractive power and made of a resin material, wherein the second lens group includes, in sequence from the object side to the image side, one lens having a negative refractive power and made of a resin material and one lens having a positive refractive power and made of a resin material, and wherein the following conditional expressions $$f12/fw > 2.0, \quad (1)$$

$$f2/fw < -2.0, \quad (2)$$

$$-2.0 \leq f12/f2 \leq -0.5, \text{ and} \quad (3)$$

$$vd21 - vd22 > 20 \quad (4)$$

are satisfied, where f12 is a focal length of the single lens having a positive refractive power included in the first lens group, f2 is a focal length of the second lens group, fw is a focal length of the total lens system at a wide angle end, vd21 is an Abbe number of the lens having a negative refractive power included in the second lens group for the d-line, and vd22 is an Abbe number of the lens having a positive refractive power included in the second lens group for the d-line.

* * * * *